US012671154B2

(12) United States Patent　　(10) Patent No.:　US 12,671,154 B2
Sasaki et al.　　(45) Date of Patent:　Jun. 30, 2026

(54) ENERGY STORAGE DEVICE AND METHOD FOR MANUFACTURING ENERGY STORAGE DEVICE

(71) Applicant: DAI NIPPON PRINTING CO., LTD., Tokyo (JP)

(72) Inventors: Miho Sasaki, Tokyo (JP); Shinichi Mikami, Tokyo (JP); Wakako Sentou, Tokyo (JP); Kiyoshi Nakada, Tokyo (JP); Jun Fukuda, Tokyo (JP); Atsushi Saitou, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 995 days.

(21) Appl. No.: 17/798,192

(22) PCT Filed: Feb. 5, 2021

(86) PCT No.: PCT/JP2021/004456
§ 371 (c)(1),
(2) Date: Aug. 8, 2022

(87) PCT Pub. No.: WO2021/157731
PCT Pub. Date: Aug. 12, 2021

(65) Prior Publication Data
US 2023/0155260 A1　　May 18, 2023

(30) Foreign Application Priority Data

Feb. 7, 2020　(JP) ................................. 2020-019549
Jun. 24, 2020　(JP) ................................. 2020-108399

(51) Int. Cl.
*H01M 50/566*　　(2021.01)
*H01M 50/171*　　(2021.01)
*H01M 50/186*　　(2021.01)

(52) U.S. Cl.
CPC ....... *H01M 50/566* (2021.01); *H01M 50/171* (2021.01); *H01M 50/186* (2021.01)

(58) Field of Classification Search
CPC ............. H01M 50/102; H01M 50/566; H01M 50/548; H01M 50/178; H01M 50/105;
(Continued)

(56) References Cited

U.S. PATENT DOCUMENTS 6,482,544 B1　11/2002　Shiota et al.
2011/0117404 A1　5/2011　Ahn et al.
(Continued)

FOREIGN PATENT DOCUMENTS

JP　　2001-256933 A　　9/2001
JP　　2002-117904 A　　4/2002
(Continued)

OTHER PUBLICATIONS

Apr. 27, 2021 International Search Report issued in International Patent Application No. PCT/JP2021/004456.
(Continued)

*Primary Examiner* — Karie O'Neill Apicella
(74) *Attorney, Agent, or Firm* — Oliff PLC

(57) ABSTRACT

An energy storage device includes an electrode body and an outer packaging. The outer packaging seals the electrode body. The outer packaging is constituted by a film-like outer packaging member. The outer packaging includes a first sealing portion sealed by joining surfaces that face each other in a state in which the outer packaging member is wrapped around the electrode body. A base portion of the first sealing portion is formed at the boundary between a first surface and a second surface of the outer packaging. The first surface has a larger area than the second surface. The first sealing portion does not overlap the first surface in a plan view.

21 Claims, 15 Drawing Sheets

(58) Field of Classification Search
CPC ............. H01M 50/543; H01M 50/184; H01M 50/172; H01M 50/171; H01M 50/536; H01M 50/557; H01M 50/148
See application file for complete search history.

(56) References Cited

U.S. PATENT DOCUMENTS

| | | |
|---|---|---|
| 2019/0173073 A1 | 6/2019 | Ahn et al. |
| 2020/0295315 A1 | 9/2020 | Kim et al. |
| 2020/0403194 A1 | 12/2020 | Amano et al. |
| 2021/0257699 A1 | 8/2021 | Mochizuki et al. |

FOREIGN PATENT DOCUMENTS

| | | | | | |
|---|---|---|---|---|---|
| JP | 2004014445 A | * | 1/2004 | ............. | H01M 2/02 |
| JP | 2005-183359 A | | 7/2005 | | |
| JP | 2006-236966 A | | 9/2006 | | |
| JP | 2009-087750 A | | 4/2009 | | |
| JP | 4509242 B2 | | 7/2010 | | |
| JP | 2011-108623 A | | 6/2011 | | |
| JP | 2013026172 A | | 2/2013 | | |
| JP | 2013-131427 A | | 7/2013 | | |
| JP | 2013-218991 A | | 10/2013 | | |
| JP | 2014-078471 A | | 5/2014 | | |
| JP | 2015-069812 A | | 4/2015 | | |
| JP | 2015076293 A | | 4/2015 | | |
| JP | 2016-134199 A | | 7/2016 | | |
| JP | 2018-077931 A | | 5/2018 | | |
| JP | 2019-153504 A | | 9/2019 | | |
| JP | 2019-153514 A | | 9/2019 | | |
| JP | 6579283 B1 | | 9/2019 | | |
| JP | 2019-207779 A | | 12/2019 | | |
| JP | 6624317 B1 | | 12/2019 | | |
| JP | 2024017547 A | | 2/2024 | | |
| JP | 2024-79748 A | | 6/2024 | | |
| KR | 10-2018-0082752 A | | 7/2018 | | |
| KR | 10-2019-0042797 A | | 4/2019 | | |
| KR | 10-2019-0055594 A | | 5/2019 | | |
| WO | 2019156113 A1 | | 8/2019 | | |

OTHER PUBLICATIONS

Apr. 27, 2021 Written Opinion of the International Searching Authority issued in International Patent Application No. PCT/JP2021/004456.
Jun. 14, 2022 Office Action issued in Japanese Patent Application No. 2022-083692.
May 16, 2024 Extended Search Report issued in European Patent Application No. 21751325.8.
Jul. 9, 2024 Office Action issued in Korean Patent Application No. 10-2022-7020141.
May 20, 2025 Office Action issued in Japanese Patent Application No. 2024-044781.
Aug. 27, 2024 Office Action issued in Japanese Patent Application No. 2024-127615.
Aug. 22, 2025 Office Action issued in European Application No. 21751325.8.
May 4, 2026 Office Action issued in European Application No. 21751325.8.

* cited by examiner

ENERGY STORAGE DEVICE AND METHOD FOR MANUFACTURING ENERGY STORAGE DEVICE

TECHNICAL FIELD

The present invention relates to an energy storage device and a method for manufacturing an energy storage device.

BACKGROUND ART

Japanese Patent No. 4509242 (Patent Literature 1) discloses a secondary battery. In this secondary battery, an electrode body is sealed in a bag formed using a laminated film (see Patent Literature 1).

CITATION LIST

Patent Literature

Patent Literature 1: Japanese Patent No. 4509242

SUMMARY OF INVENTION

Technical Problem

In the secondary battery disclosed in Patent Literature 1 above, a seal portion is provided on a surface of the laminated film that has a large area. Because the seal portion is a region where portions of the film are overlaid on each other, the seal portion is thicker than the other regions. When another secondary battery is stacked on the surface provided with the seal portion, the upper secondary battery may become inclined at the seal portion. As a result, unevenness in the distribution of pressure applied to the lower secondary battery increases. When a plurality of secondary batteries are arranged side-by-side in the lateral direction such that the surfaces provided with the seal portions are in contact with adjacent secondary batteries, unevenness in the distribution of pressures applied by the adjacent secondary batteries also increases.

The present invention was made to resolve such issues, and aims to provide an energy storage device that is capable of suppressing unevenness in the distribution of pressure applied to adjacent energy storage devices when a plurality of energy storage devices are stacked, and a method for manufacturing the energy storage device.

Solution to Problem

An energy storage device according to an aspect of the present invention includes an electrode body and an outer packaging. The outer packaging seals the electrode body. The outer packaging is constituted by a film-like outer packaging member. The outer packaging includes a first sealing portion that is sealed by joining surfaces that face each other in a state in which the outer packaging member is wrapped around the electrode body. A base portion of the first sealing portion is formed at a boundary between a first surface and a second surface of the outer packaging. The first surface has a larger area than the second surface. The first sealing portion does not overlap the first surface in a plan view.

In this energy storage device, the first sealing portion does not overlap the first surface having a large area in a plan view. That is, the first sealing portion is not present on the first surface having a large area. Therefore, even when other energy storage devices are disposed on the first surface or disposed side-by-side, the other energy storage devices do not become inclined. As a result, according to this energy storage device, when a plurality of energy storage devices are stacked, it is possible to suppress unevenness in the distribution of pressure applied to adjacent energy storage devices. Also, in this energy storage device, the base portion of the first sealing portion is present on the boundary between the first surface and the second surface of the outer packaging. Therefore, according to this energy storage device, when the first sealing portion is placed on the second surface, it is possible to secure a wider joining width of the first sealing portion, compared to a case where the base portion of the first sealing portion is present on the second surface.

In the energy storage device, the first sealing portion may be bent so as to be in contact with the second surface.

In the energy storage device, the first sealing portion may cover substantially the entire second surface in a state in which the first sealing portion is bent so as to be in contact with the second surface.

According to this energy storage device, it is possible to secure a wider joining width of the first sealing portion due to the first sealing portion covering substantially the entire second surface.

The energy storage device may further include an electrode terminal that is electrically connected to the electrode body, in which the outer packaging may further include a second sealing portion sealed in a state of holding the electrode terminal, a portion of the electrode terminal may be located outside the outer packaging, and a base portion of the portion of the electrode terminal may be located at a position at approximately half of the thickness of the energy storage device in a thickness direction of the energy storage device.

In this energy storage device, a portion of the electrode terminal located outside the outer packaging is located at a position at approximately half of the thickness of the energy storage device in the thickness direction of the energy storage device. Therefore, according to this energy storage device, it is possible to further reduce the difference between the longest distance and the shortest distance out of the distances between the electrode terminal and each of the plurality of electrodes included in the electrode body, compared to a case where this portion is located at substantially the same position as the first surface in the thickness direction of the energy storage device, for example.

In the energy storage device, a region where a joining force between the surfaces is strong and a region where the joining force between the surfaces is weak may be located side-by-side along the boundary in the first sealing portion.

In the energy storage device, a thin region and a thick region may be located side-by-side along the boundary in the first sealing portion.

The energy storage device may further include an electrode terminal that is electrically connected to the electrode body, in which the first sealing portion may be sealed in a state of holding the electrode terminal.

The energy storage device may further include an electrode terminal that is electrically connected to the electrode body and a lid body to which the electrode terminal is attached, in which the outer packaging may further include a second sealing portion sealed in a state of being joined to the lid body.

In the energy storage device, the lid body may include a first surface facing the electrode body and a second surface that is opposite to the first surface, and the second sealing portion may include a portion where the outer packaging and the second surface are joined together.

The energy storage device may further include a lid body, in which the outer packaging may further include a second sealing portion sealed in a state of being joined to the lid body, the lid body may include a metal portion that is a portion where a metal layer is exposed on a surface of the lid body or that is a portion made of a metal material, and the metal portion and the electrode body may be welded to each other.

The energy storage device may further include an electrode terminal that is electrically connected to the electrode body, in which the outer packaging may further include an extending portion that protrudes outward and a second sealing portion sealed in a state in which the electrode terminal is held by the extending portion.

In the energy storage device, a direction extending along the boundary may be a direction orthogonal to a machine direction of the outer packaging member.

In the energy storage device, when the first sealing portion is bent along the boundary, the direction extending along the boundary is a direction orthogonal to the machine direction of the outer packaging member. Therefore, according to this energy storage device, even when a crease is formed in the direction orthogonal to the machine direction of the outer packaging member, the outer packaging member is unlikely to rupture, and thus, it is possible to reduce the likelihood that the first sealing portion ruptures due to the first sealing portion being bent.

An energy storage device according to another aspect of the present invention includes an electrode body, an electrode terminal that is electrically connected to the electrode body, and an outer packaging that seals the electrode body. The outer packaging is constituted by a film-like outer packaging member, and includes a long side and a short side in a plan view. The electrode terminal is disposed along the long side.

An energy storage device according to another aspect of the present invention includes an electrode body and an outer packaging. The outer packaging seals the electrode body. In the outer packaging, the outer packaging member is constituted by a film-like outer packaging member. The outer packaging includes a piece in which peripheral edges of surfaces that face each other are joined together in a state in which the outer packaging is wrapped around the electrode body. A base portion of the piece is formed at a boundary between surfaces of the outer packaging. A space in which the surfaces that face each other are not joined is formed in the piece. In the piece, a region in which the surfaces that face each other are joined together and a region in which the surfaces that face each other are not joined are located side-by-side in a vicinity of the boundary.

Gas may be generated inside the outer packaging. In this energy storage device, the space is formed in the piece, and the region in which the surfaces that face each other are joined together and the region in which the surfaces that face each other are not joined are located side-by-side in a vicinity of the boundary. Therefore, according to this energy storage device, gas can be discharged from the outer packaging through the piece by unsealing the outer packaging with use of the piece. Then, by unsealing the outer packaging, a degassed energy storage device can be manufactured.

A method for manufacturing an energy storage device according to another aspect of the present invention is a manufacturing method for manufacturing an energy storage device from an unfinished product. The unfinished product includes an electrode body and an outer packaging. The outer packaging seals the electrode body. The outer packaging is constituted by a film-like outer packaging member. The outer packaging includes a piece in which peripheral edges of surfaces that face each other are joined together in a state in which the outer packaging member is wrapped around the electrode body. A base portion of the piece is formed at a boundary between surfaces of the outer packaging. A space in which the surfaces that face each other are not joined is formed in the piece. In the piece, a region in which the surfaces that face each other are joined together and a region in which the surfaces that face each other are not joined are located side-by-side in a vicinity of the boundary. The manufacturing method includes a step of unsealing the outer packaging with use of the piece and discharging gas from the outer packaging, and a step of resealing the outer packaging by joining the surfaces that face each other together in at least a portion of the piece.

According to the method for manufacturing an energy storage device, a degassed energy storage device can be manufactured by discharging gas via the piece and resealing the outer packaging.

Advantageous Effects of Invention

According to the present invention, it is possible to provide an energy storage device that is capable of suppressing unevenness in the distribution of pressure applied to lower energy storage devices when a plurality of energy storage devices are stacked on each other, and a method for manufacturing the energy storage device.

DESCRIPTION OF EMBODIMENTS

Figure 1:
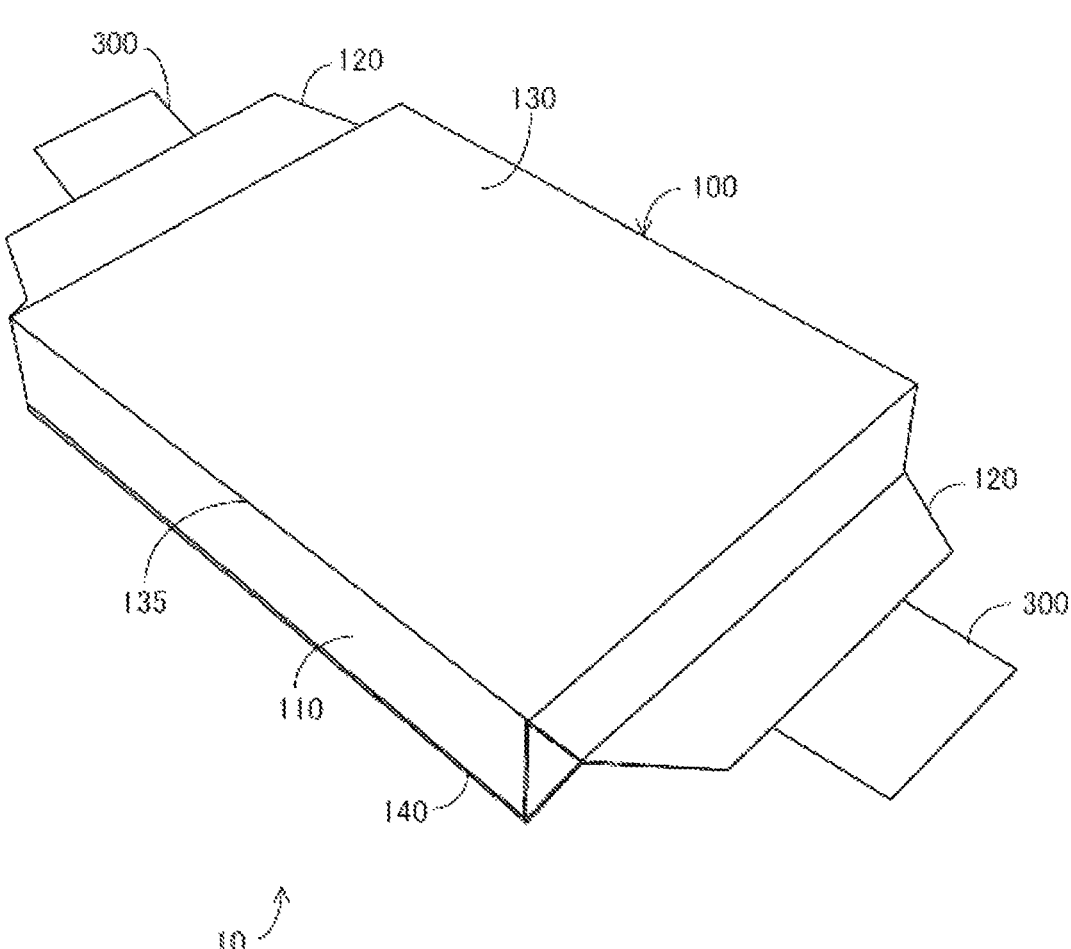
FIG. 1 is a perspective view schematically showing an energy storage device according to Embodiment 1.

Hereinafter, embodiments of the present invention will be described in detail with reference to the drawings. Note that, in the drawings, identical or corresponding portions have been assigned the same reference numerals, and their explanation is not repeated.

1. Embodiment 1

1-1. Configuration of Energy Storage Device

Figure 2:
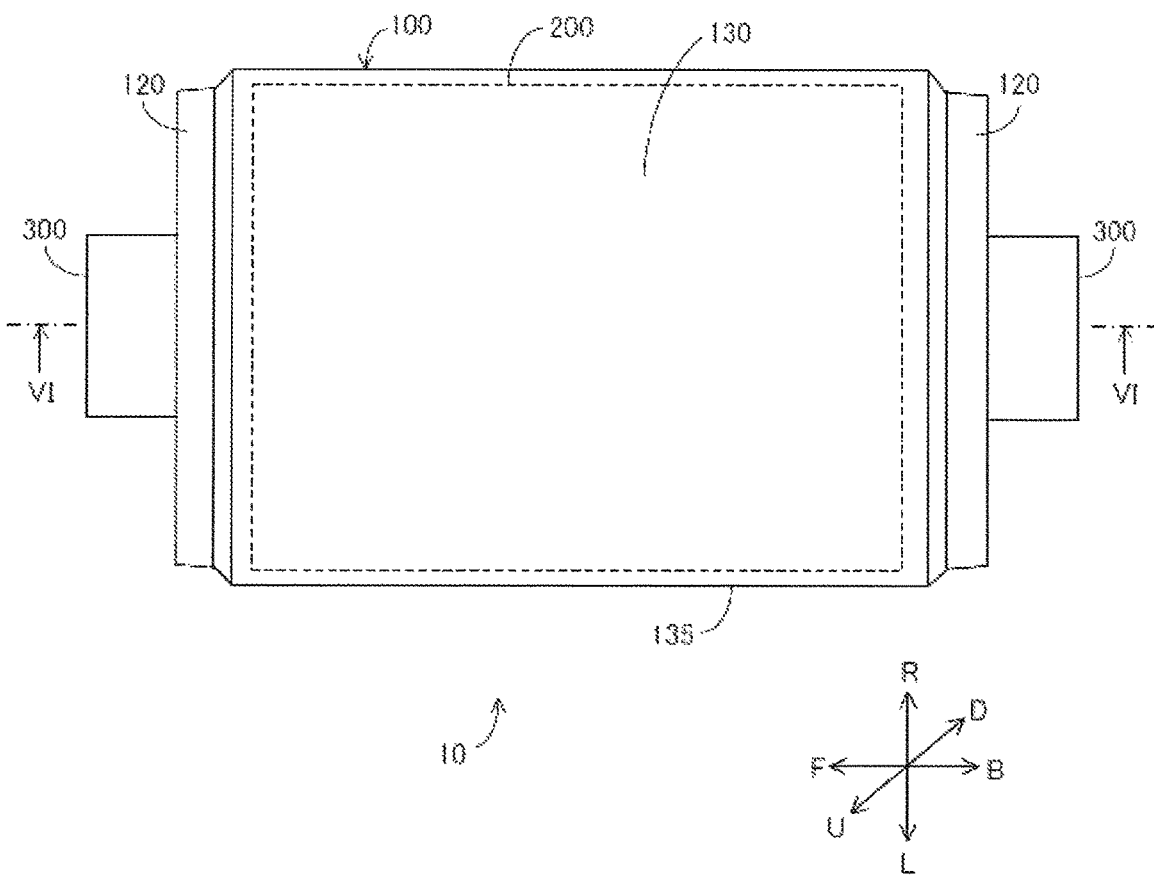
FIG. 2 is a plan view schematically showing the energy storage device.
Figure 3:
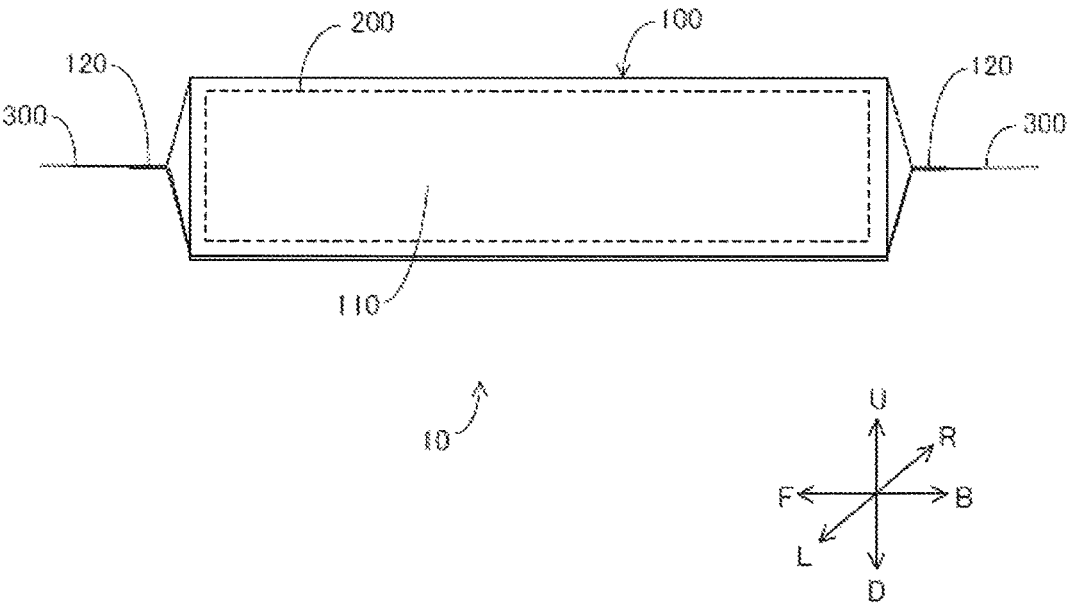
FIG. 3 is a side view schematically showing the energy storage device.

FIG. 1 is a perspective view schematically showing an energy storage device 10 according to Embodiment 1. FIG. 2 is a plan view schematically showing the energy storage device 10. FIG. 3 is a side view schematically showing the energy storage device 10. Note that an arrow UD direction indicates the thickness direction of the energy storage device 10, and an arrow LR direction indicates the width direction of the energy storage device 10 in FIGS. 2 and 3. Also, an arrow FB direction indicates the depth direction of the energy storage device 10. The directions that are respectively indicated by the arrows UD, LR, and FB are the same in the following diagrams.

Referring to FIGS. 1, 2, and 3, the energy storage device 10 includes an electrode body 200, an outer packaging 100, and a plurality (two) of electrode terminals 300. The electrode body 200 includes electrodes (positive and negative electrodes) and a separator that constitute an energy storage member such as a lithium-ion battery, a capacitor, or an all-solid-state battery. The shape of the electrode body 200 is a substantially rectangular parallelepiped. Note that a "substantially rectangular parallelepiped" includes a solid that can be regarded as a rectangular parallelepiped by modifying the shape of a portion of the outer surface thereof, for example, in addition to a perfect rectangular parallelepiped.

The electrode terminal 300 is a metal terminal used for inputting and outputting power in the electrode body 200. One end part of the electrode terminal 300 is electrically connected to an electrode (a positive electrode or negative electrode) included in the electrode body 200, and the other end part protrudes outward from an end edge of the outer packaging 100.

A metal material constituting the electrode terminal 300 is aluminum, nickel, copper, or the like, for example. If the electrode body 200 is a lithium-ion battery, for example, the electrode terminal 300 to be connected to a positive electrode is usually made of aluminum or the like, and the electrode terminal 300 to be connected to a negative electrode is usually made of copper, nickel, or the like.

The outer packaging 100 is constituted by a film-like outer packaging member 101 (FIG. 4 or the like), and seals the electrode body 200. In the energy storage device 10, the outer packaging 100 is formed by wrapping the outer packaging member 101 around the electrode body 200 and sealing the open portion.

There is a method for forming an accommodating portion (recess) for accommodating the electrode body 200 in the outer packaging member 101 through cold molding, for example. However, it is not always easy to form a deep accommodating portion using such a method. If a deep storage portion (recess) (e.g., a molding depth of 15 mm) is to be formed through cold molding, pinholes or cracks may form in the outer packaging member, and battery performance may deteriorate. On the other hand, the outer packaging 100 seals the electrode body 200 due to the outer packaging member 101 being wrapped around the electrode body 200, and thus can easily seal the electrode body 200 regardless of the thickness of the electrode body 200. Note that, in order to reduce the dead space between the electrode body 200 and the outer packaging member 101 in order to increase the volumetric energy density of the energy storage device 10, it is preferable that the outer packaging member 101 is wrapped around the electrode body 200 so as to be in contact with the outer surface of the electrode body 200. Further, in an all-solid-state battery, the space between the electrode body 200 and the outer packaging member 101 also needs to be eliminated from the viewpoint that high pressure needs to be evenly applied from the outer surface of the battery in order to exhibit battery performance, and thus it is preferable that the outer packaging member 101 is wrapped around the electrode body 200 so as to be in contact with the outer surface of the electrode body 200.

The outer packaging member 101 is a laminate (laminated film) having a base material layer, a barrier layer, and a heat-sealable resin layer in the stated order, for example. Note that the outer packaging member 101 need not include all of these layers, and a barrier layer need not be included, for example. That is, the outer packaging member 101 need only be made of a flexible material that can be easily bent, and may also be constituted by a resin film, for example. Note that the outer packaging member 101 is preferably heat-sealable.

The base material layer included in the outer packaging member 101 is a layer for imparting heat resistance to the outer packaging member 101 and suppressing the formation of pinholes that may form during processing or distribution. The base material layer is constituted including at least either a stretched polyester resin layer or a stretched polyamide resin layer, for example. Because the base material layer includes at least either the stretched polyester resin layer or the stretched polyamide resin layer, it is possible to protect the barrier layer during processing of the outer packaging member 101 and to suppress rupture of the outer packaging member 101, for example. Also, from the viewpoint of increasing the tensile elongation of the outer packaging member 101, the stretched polyester resin layer is preferably a biaxially stretched polyester resin layer, and the stretched polyamide resin layer is preferably a biaxially stretched polyamide resin layer. Furthermore, from the viewpoint of improving piercing strength and impact strength, the stretched polyester resin layer is more preferably a biaxially stretched polyethylene terephthalate (PET) film, and the stretched polyamide resin layer is more preferably a biaxially stretched nylon (ONy) film. Note that the base material layer may be constituted including both the stretched polyester resin layer and the stretched polyamide resin layer. From the viewpoint of film strength, the thickness of the base material layer is preferably in a range of 5 to 300 μm, and more preferably in a range of 20 to 150 μm, for example.

Also, the barrier layer included in the outer packaging member 101 is constituted by an aluminum foil, for viewpoint example, from the of moisture resistance, workability such as extensibility, and cost. From the viewpoint of packaging suitability and pinhole resistance when packaging the electrode body 200, the aluminum foil preferably contains iron. The iron content in the aluminum foil is preferably in a range of 0.5 to 5.0 mass %, and more preferably in a range of 0.7 to 2.0 mass %. Because the iron content is 0.5 mass % or more, the outer packaging member 101 has packaging suitability, and high pinhole resistance and extensibility. Further, because the iron content is 5.0 mass % or less, the outer packaging member 101 is highly flexible.

From the viewpoint of barrier properties, pinhole resistance, and packaging suitability, the thickness of the barrier layer is preferably in a range of 15 to 100 μm, and more preferably in a range of 30 to 80 μm, for example. When the barrier layer has a thickness of 15 μm or more, the outer packaging member 101 is less likely to rupture even when stress is applied due to a packaging process. When the barrier layer has a thickness of 100 μm or less, it is possible to reduce an increase in the mass of the outer packaging member 101 and to suppress a decrease in the gravimetric energy density of the energy storage device 10.

Also, if the barrier layer is an aluminum foil, in order to prevent dissolution and corrosion, it is preferable that a corrosion resistance film is provided on at least the surface of the barrier layer that is opposite to the base material layer. Corrosion resistance films may be provided on both sides of the barrier layer. Here, a corrosion resistance film refers to a thin film that is formed by subjecting the surface of the barrier layer to hydrothermal transformation treatment such as boehmite treatment, chemical conversion treatment, anodizing treatment, plating such as nickel or chromium plating, or corrosion prevention treatment for applying a coating agent thereto, so as to impart corrosion resistance (e.g., acid resistance and alkali resistance) to the surface of the barrier layer. Specifically, the corrosion resistance film refers to a film for improving the acid resistance of the barrier layer (acid resistance film), a film for improving the alkali resistance of the barrier layer (alkali resistance film), or the like. One type of treatment for forming the corrosion resistance film may be performed, or two or more types of treatments for forming the corrosion resistance film may be performed in combination. Further, the film may have multiple layers instead of a single layer. Also, among these treatments, the hydrothermal transformation treatment and the anodizing treatment are treatments in which the surface of a metal foil is dissolved using a treatment agent so as to form a metal compound having high corrosion resistance. Note that these treatments may be included in the definition of chemical conversion treatment. Also, if the barrier layer has a corrosion resistance film, the barrier layer includes the corrosion resistance film.

When the outer packaging member 101 is molded, the corrosion resistance film exhibits the effects of preventing delamination between the barrier layer (e.g., an aluminum alloy foil) and the base material layer, preventing the surface of the barrier layer from being dissolved and corroded due to hydrogen fluoride generated in a reaction between an electrolyte and moisture, in particular, if the barrier layer is an aluminum alloy foil, preventing aluminum oxide present on the surface of the barrier layer from being dissolved and corroded, improving the adhesiveness (wettability) of the surface of the barrier layer, preventing delamination between the base material layer and the barrier layer during heat sealing, and preventing delamination between the base material layer and the barrier layer during molding.

Also, the heat-sealable resin layer included in the outer packaging member 101 is a layer that imparts sealing properties to the outer packaging member 101 through heat sealing. Examples of the heat-sealable resin layer include a polyolefin-based resin and a resin film made of an acid-modified polyolefin-based resin obtained by graft-modifying a polyolefin-based resin using an acid such as maleic anhydride or the like. From the viewpoint of sealing properties and strength, the thickness of the heat-sealable resin layer is preferably in a range of 20 to 300 μm, and more preferably in a range of 40 to 150 μm, for example.

The outer packaging member 101 preferably has a layer having one or more cushion functions (referred to as "cushion layer" hereinafter) outward of the heat-sealable resin layer, more preferably outward of the barrier layer. The cushion layer may be laminated outward of the base material layer, or the base material layer may have the function of the cushion layer. If the outer packaging member 101 has a plurality of cushion layers, the plurality of cushion layers may be adjacent to each other, or may be laminated with the base material layers, the barrier layers, or the like interposed therebetween.

A material constituting the cushion layer can be selected from materials having cushion properties. Examples of the material having cushion properties include rubber, non-woven fabric, and a foam sheet. Examples of rubber include natural rubber, fluororubber, and silicone rubber. The rubber hardness is preferably in a range of about 20 to 90. The material constituting the non-woven fabric preferably has high heat resistance. If the cushion layer is constituted by non-woven fabric, the lower limit of the thickness of the cushion layer is preferably 100 μm, more preferably 200 μm, and even more preferably 1000 μm. If the cushion layer is constituted by non-woven fabric, the upper limit of the thickness of the cushion layer is preferably 5000 μm and more preferably 3000 μm. Preferable ranges for the thickness of the cushion layer are 100 μm to 5000 μm, 100 μm to 3000 μm, 200 μm to 3000 μm, 1000 μm to 5000 μm, or 1000 μm to 3000 μm. Specifically, the thickness of the cushion layer is most preferably in a range of 1000 μm to 3000 μm.

If the cushion layer is constituted by rubber, the lower limit of the thickness of the cushion layer is preferably 0.5 mm. If the cushion layer is constituted by rubber, the upper limit of the thickness of the cushion layer is preferably 10 mm, more preferably 5 mm, and even more preferably 2 mm. If the cushion layer is constituted by rubber, preferable ranges for the thickness of the cushion layer are 0.5 mm to 10 mm, 0.5 mm to 5 mm, or 0.5 mm to 2 mm.

If the outer packaging member 101 has a cushion layer, the cushion layer functions as a cushion. Therefore, the outer packaging member 101 is prevented from being damaged by impact when the energy storage device 10 falls, or during handling of the energy storage device 10 while manufacturing the energy storage device 10.

Figure 4:
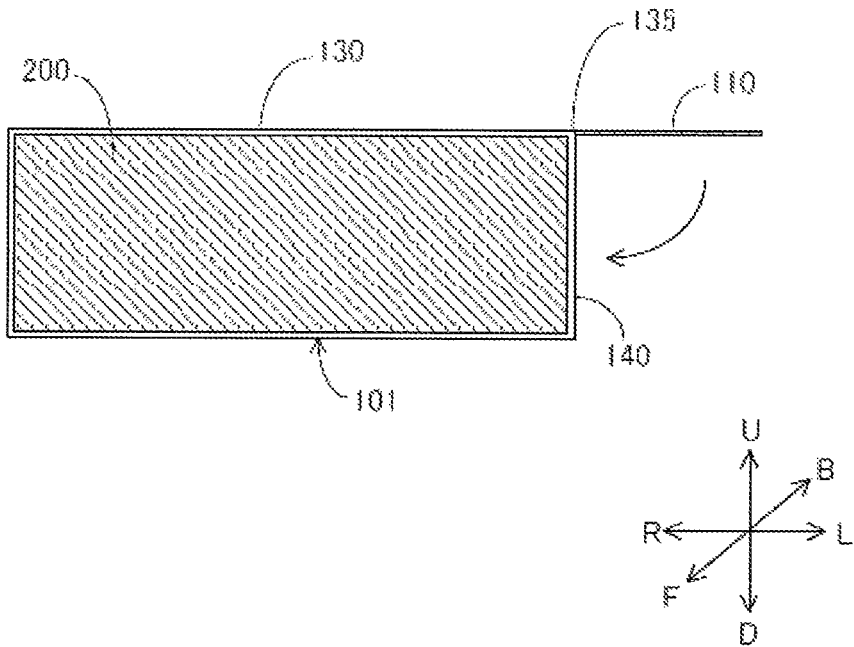
FIG. 4 is a diagram showing, from one lateral side, a state in which an outer packaging member is wrapped around an electrode body during the manufacturing of the energy storage device according to Embodiment 1.

FIG. 4 is a diagram showing, from one lateral side, a state in which the outer packaging member 101 is wrapped around the electrode body 200 during the manufacturing of the energy storage device 10. As shown in FIG. 4, the outer packaging member 101 is wrapped around the electrode body 200. In this case, the outermost layer of the electrode body 200 need not be an electrode, and may be protective tape or a separator, for example. The first sealing portion 110 is formed by heat-sealing surfaces (heat-sealable resin layers) of the outer packaging member 101 that face each other in a state in which the outer packaging member 101 is wrapped around the electrode body 200.

A base portion of the first sealing portion 110 is located on a side 135 of the outer packaging 100. The side 135 is formed at the boundary between a first surface 130 and a second surface 140, which has a smaller area than the first surface 130. That is, it can be said that the base portion of the first sealing portion 110 is formed at the boundary between the first surface 130 and the second surface 140, and is not present on either the first surface 130 or the second surface 140. In the energy storage device 10, the first sealing portion 110 is bent at the side 135 toward the second surface 140. In the energy storage device 10, the first sealing portion 110 is in contact with the second surface 140, and covers substantially the entire second Note that "substantially the entire second surface 140. surface 140" refers to a region having 75% or more of the area of the second surface 140.

That is, in the energy storage device 10, the first sealing portion 110 is not formed on the first surface 130 having a large area. The first surface 130 is flatter than in a case where a sealing portion such as the first sealing portion 110 is in contact with the first surface 130. Therefore, even when another energy storage device 10 is mounted on the first surface 130, the other energy storage device 10 does not become inclined. As a result, according to the energy storage device 10, it is possible to suppress unevenness in the distribution of pressure applied to a lower energy storage device 10 when a plurality of the energy storage devices 10 are stacked on each other. In other words, if a module is formed by stacking a plurality of energy storage devices 10 on each other, it is possible to prevent the first sealing portion 110 from being disposed on a surface (the first surface 130) that is adjacent to the adjacent energy storage device 10. Further, in an all-solid-state battery, such a configuration is also preferable from the viewpoint that high pressure needs to be evenly applied from the outer surface of the battery in order to exhibit battery performance.

Also, in the energy storage device 10, the base portion of the first sealing portion 110 is located on the side 135 of the outer packaging 100. Therefore, according to the energy storage device 10, it is possible to secure a wider joined region of the first sealing portion 110, compared with a case where the base portion of the first sealing portion 110 is located on the second surface 140 (e.g., the center portion of the second surface 140 in the arrow UD direction). Note that the joined region of the first sealing portion 110 need not be the entire region of the first sealing portion 110, and may be a portion of the first sealing portion 110 such as only the vicinity of the base portion of the first sealing portion 110, for example.

Further, in the energy storage device 10, substantially the entire second surface 140 is covered by the first sealing portion 110. That is, in the energy storage device 10, the length of the first sealing portion 110 in the arrow UD direction is longer than in a case where the first sealing portion 110 covers only half or less of the second surface 140 (see FIG. 3). Therefore, according to the energy storage device 10, it is possible to secure a wide joined region of the first sealing portion 110. Further, because substantially the entire second surface 140 is covered by the first sealing portion 110, the energy storage device 10 is stabilized, even when the energy storage device 10 is placed upright such that the second surface 140 is in contact with the mounting surface. That is, the energy storage device 10 is unlikely to become inclined with respect to the mounting surface. Thus, such a configuration is effective when a plurality of energy storage devices 10 are arranged side-by-side to form a module, for example.

Figure 5:
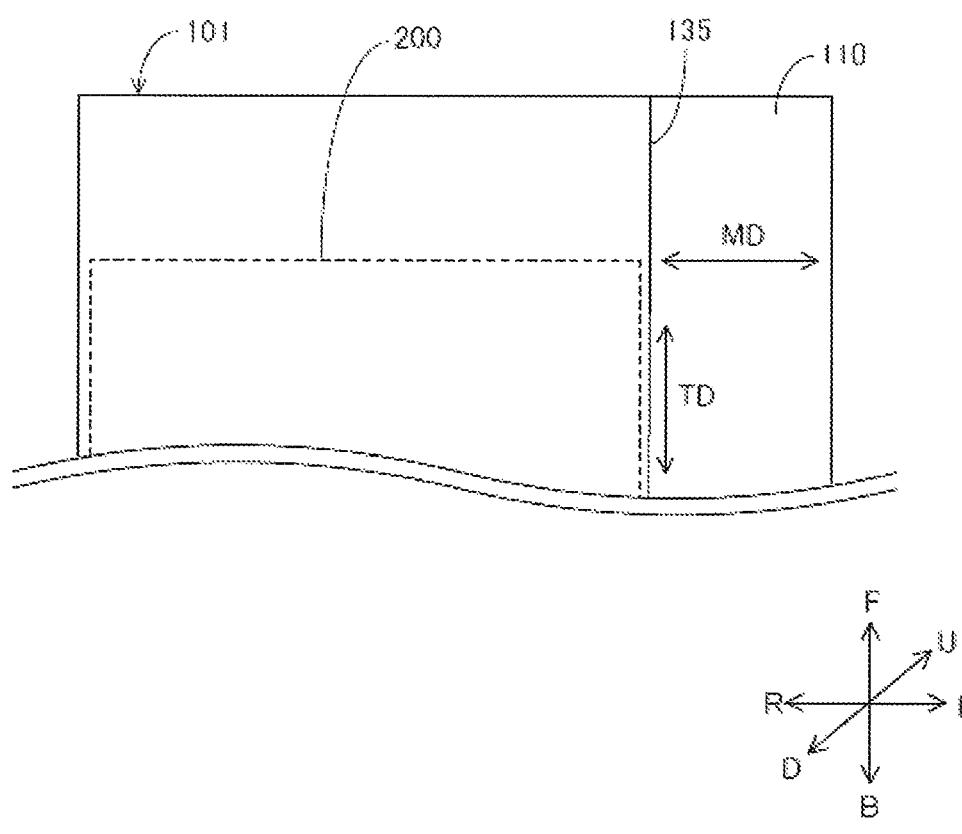
FIG. 5 is a diagram showing, from below, a state in which an outer packaging member is wrapped around an electrode body during the manufacturing of the energy storage device according to Embodiment 1.

FIG. 5 is a diagram showing, from below, a state in which the outer packaging member 101 is wrapped around the electrode body 200 during the manufacturing of the energy storage device 10. As shown in FIG. 5, in the energy storage device 10, the direction extending along the side 135 is the TD (Transverse Direction) of the outer packaging member 101, and the direction orthogonal to the side 135 is the MD (Machine Direction) of the outer packaging member 101. That is, the direction extending along the side 135 is the direction (TD) orthogonal to the machine direction (MD) of the outer packaging member 101.

In the energy storage device 10, the first sealing portion 110 is bent along the side 135, and the direction extending along the side 135 is a direction orthogonal to the machine direction of the outer packaging member 101. Therefore, according to this energy storage device 10, even when a crease is formed in the direction orthogonal to the machine direction of the outer packaging member 101, the outer packaging member 101 is unlikely to rupture, and thus, it is possible to reduce the likelihood that the first sealing portion 110 ruptures due to the first sealing portion 110 being bent.

The machine direction (MD) of the outer packaging member 101 corresponds to the rolling direction (RD) of the metal foil (aluminum alloy foil or the like) in the barrier layer included in the outer packaging member 101. The TD of the outer packaging member 101 corresponds to the TD of the metal foil. The rolling direction (RD) of the metal foil can be determined based on rolling marks.

Also, a sea-island structure can be confirmed by observing multiple cross-sections of the heat-sealable resin layer of the outer packaging member 101 using an electron microscope, and the direction that is parallel to the cross-section where the average diameter of the islands in the direction that is perpendicular to the thickness direction of the heat-sealable resin layer (also referred to as the "length direction of the heat-sealable resin layer" hereinafter) is the maximum can be determined as the MD. If the MD of the outer packaging member 101 cannot be specified using the rolling marks on the metal foil, the MD can be specified using this method.

Specifically, the sea-island structure was checked by observing electron micrographs of a cross-section in the length direction of the heat-sealable resin layer and cross-sections (ten cross-sections in total), which are obtained by changing the angle at increments of 10 degrees from the direction parallel to the cross-section in the length direction to the direction perpendicular to the cross-section in the length direction. Then, with regard to each island on the cross-sections, the island diameter d is measured using the linear distance connecting the two ends in the direction perpendicular to the thickness direction of the heat-sealable resin layer. Then, the average of the dimeters d of the top 20 islands from the largest diameter is calculated for each cross-section. The direction that is parallel to the cross-section having the largest average of the island dimeters d is then determined as the MD.

Figure 6:
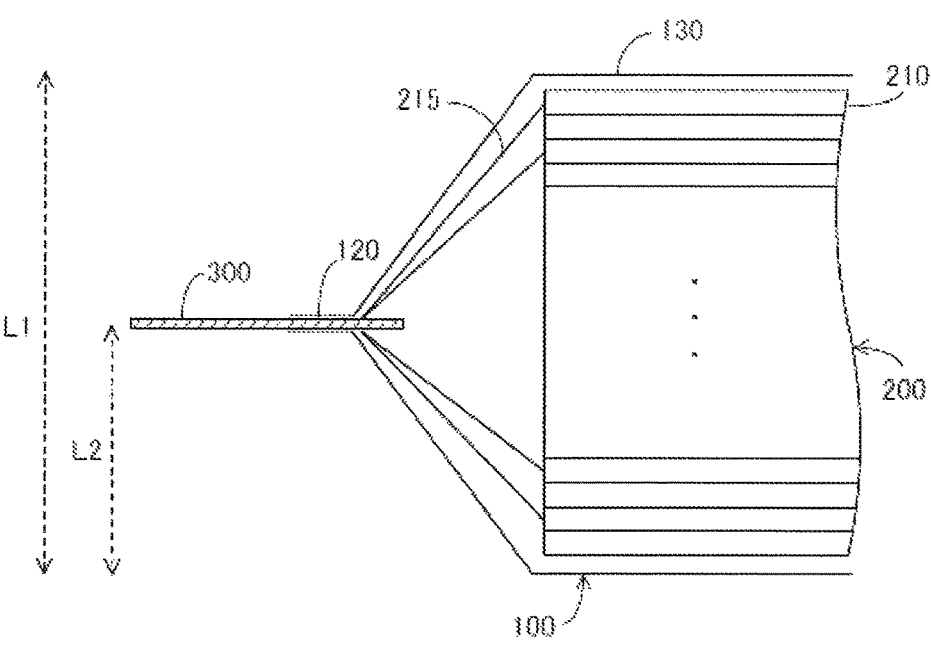
FIG. 6 is a diagram schematically showing a portion of a cross-section taken along VI-VI in FIG. 2.

FIG. 6 is a diagram schematically showing a portion of a cross-section taken along VI-VI in FIG. 2. As shown in FIG. 6, the second sealing portion 120 is sealed in a state in which the outer packaging 100 holds the electrode terminal 300.

Figure 7:
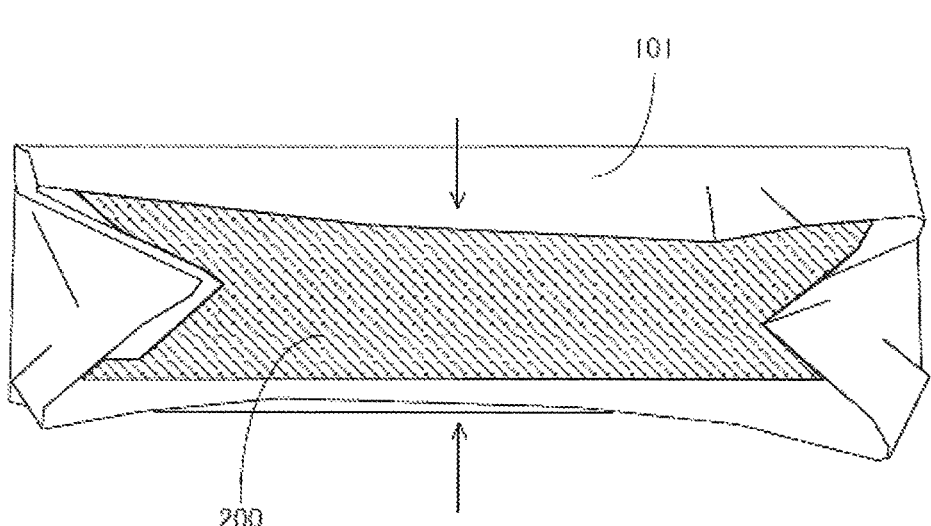
FIG. 7 is a diagram illustrating a method for forming a second sealing portion.
Figure 7:
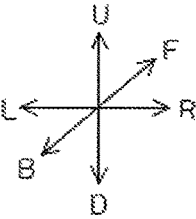

FIG. 7 is a diagram illustrating a method for forming the second sealing portion 120. As shown in FIG. 7, the second sealing portion 120 is formed by folding the outer packaging member 101, and heat-sealing the surfaces (heat-sealable resin layers) of the outer packaging member 101 that face each other. Note that, although not shown in FIG. 7, the electrode terminal 300 is located between the surfaces of the outer packaging member 101 that face each other. Note that an adhesive film for adhering to both metal and resin may be disposed between the electrode terminal 300 and the outer packaging member 101.

Referring to FIG. 6 again, the electrode body 200 includes a plurality of electrodes 210 (a positive electrode and a negative electrode). A current collector 215 extending from each electrode 210 is connected to the electrode terminal 300. In the energy storage device 10, a portion of the electrode terminal located outside the outer packaging 100 is located at a position at substantially half of the thickness of the energy storage device 10 in the thickness direction of the energy storage device 10. That is, a length L2 is approximately half of the length L1. Note that "approximately half of the thickness of the energy storage device 10" refers to being in a range of 35% to 65% of the thickness of the energy storage device 10.

Therefore, according to the energy storage device 10, it is possible to reduce the difference between the longest distance and the shortest distance out of the distances between the electrode terminal 300 and each of the plurality of electrodes 210, compared with a case where the electrode terminal 300 is located at substantially the same position as the first surface 130 in the thickness direction of the energy storage device 10.

1-2. Method for Manufacturing Energy Storage Device

Figure 8:
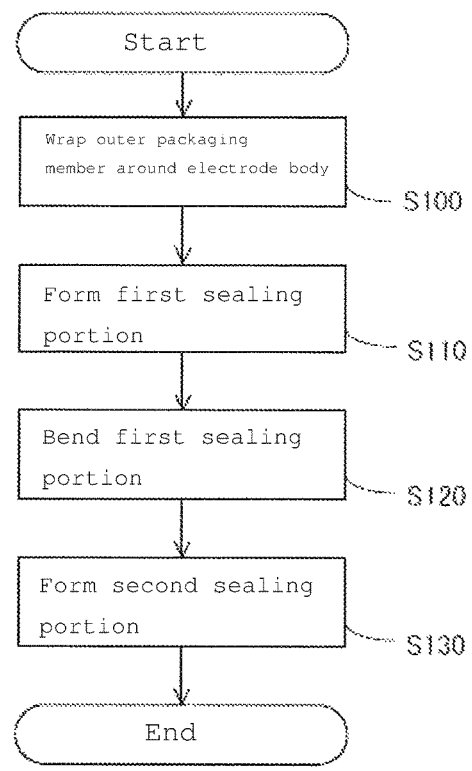
FIG. 8 is a flowchart showing a procedure for manufacturing the energy storage according to Embodiment 1.

FIG. 8 is a flowchart showing a procedure for manufacturing the energy storage device 10. The steps shown in FIG. 8 are performed by an apparatus for manufacturing the energy storage device 10, for example.

The manufacturing apparatus wraps the outer packaging member 101 around the electrode body 200 (step S100). The manufacturing apparatus forms the first sealing portion 110 by heat-sealing surfaces (the heat-sealable resin layers) of the outer packaging member 101 that face each other (step S110). Accordingly, an unfinished product shown in FIGS. 4 and 5 is obtained.

The manufacturing apparatus bends the first sealing portion 110 such that the first sealing portion 110 comes into contact with the second surface 140 (step S120). The manufacturing apparatus forms the second sealing portion 120 by folding the outer packaging member 101 in a state in which the electrode body 200 is accommodated, and heat-sealing the surfaces (the heat-sealable resin layers) of the outer packaging member 101 that face each other (step S130). Accordingly, the energy storage device 10 is completed.

1-3. Characteristics

As described above, in the energy storage device 10 according to Embodiment 1, the first sealing portion 110 is bent toward the second surface 140 having a smaller area. That is, the first sealing portion 110 is not present on the first surface 130 having a larger area. Therefore, even when another energy storage device 10 is placed on the first surface 130, the other energy storage device 10 does not become inclined. As a result, according to the energy storage device 10, it is possible to suppress unevenness in the distribution of pressure applied to a lower energy storage device 10 when a plurality of the energy storage devices 10 are stacked on each other. Further, if this energy storage device 10 is used in an all-solid-state battery, a packaging form of the present invention is preferable because high pressure needs to be evenly applied from the outer surface of the battery in order to exhibit battery performance. Also, in the energy storage device 10, the base portion of the first sealing portion 110 is located on the side 135 of the outer packaging 100. Therefore, according to the energy storage device 10, when the first sealing portion 110 is placed on the second surface 140, it is possible to secure a wider joining width of the first sealing portion 110, compared to a case where the base portion of the first sealing portion 110 is present on the second surface 140.

2. Embodiment 2

In the energy storage device 10 according to Embodiment 1 above, the second sealing portion 120 is formed by folding the outer packaging member 101 and heat-sealing the surfaces of the outer packaging member 101 that face each other. However, the shape of the second sealing portion 120 and the method for forming the second sealing portion 120 are not limited to this. Note that the following mainly describes portions that are different from those in Embodiment 1, and portions that are used in common with Embodiment 1 will not be described.

2-1. Configuration of Energy Storage Device

Figure 9:
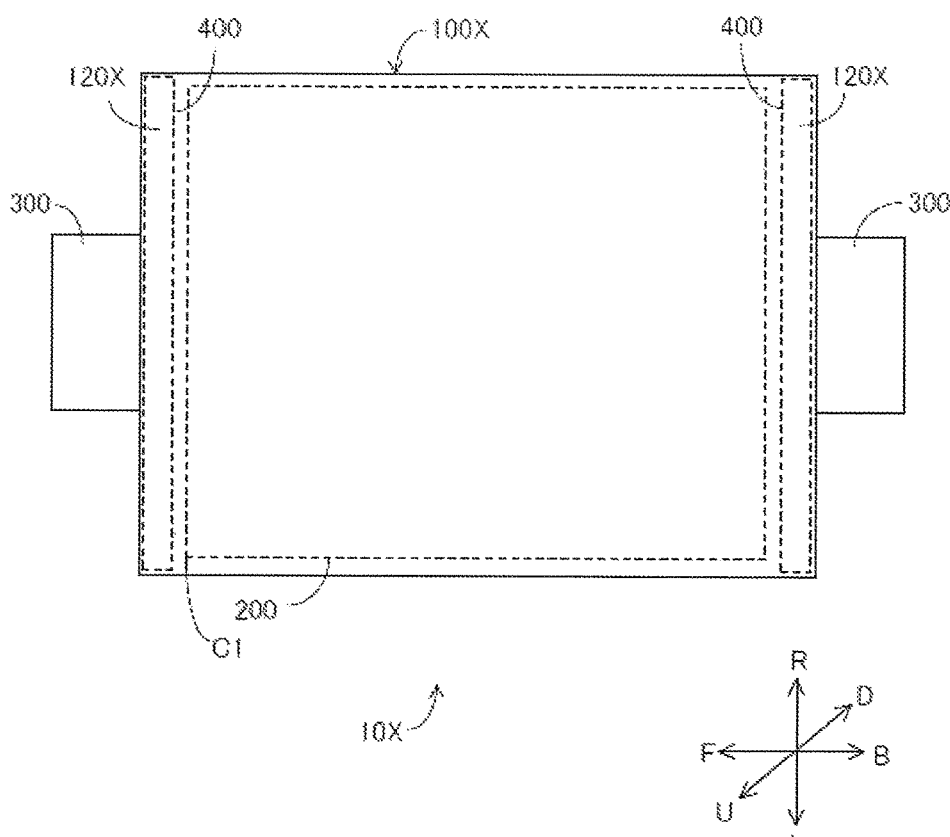
FIG. 9 is a plan view schematically showing an energy storage device according to Embodiment 2.
Figure 10:
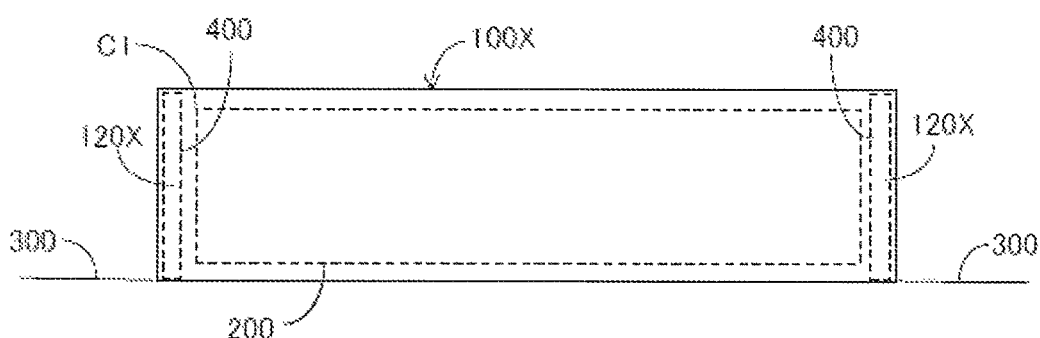
FIG. 10 is a side view schematically showing an energy storage device.
Figure 10:
Figure 11:
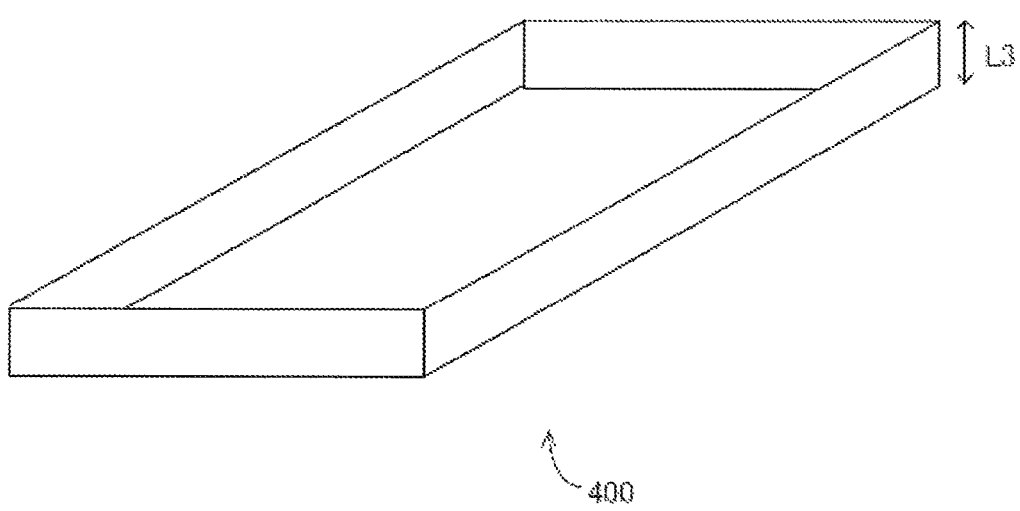
FIG. 11 is a perspective view schematically showing a lid body.

FIG. 9 is a plan view schematically showing an energy storage device 10X according to Embodiment 2. FIG. 10 is a side view schematically showing the energy storage device 10X. FIG. 11 is a perspective view schematically showing a lid body 400.

Referring to FIGS. 9, 10, and 11, the outer packaging 100X is configured by fitting the lid body 400 against opening portions at the two ends of the outer packaging member 101 wrapped around the electrode body 200. The second sealing portion 120X is formed by heat-sealing the outer packaging member 101 and the lid body 400 in a state in which the lid body 400 is fitted against the opening portions. The lid body 400 is a tray-shaped member having a bottom and a rectangular shape in a plan view, and is formed by cold molding the outer packaging member 101, for example. Note that the lid body 400 need not be constituted by the outer packaging member 101, and may be a metal molded article or resin molded article. In the energy storage device 10x, the lid body 400 is disposed such that the bottom side of the lid body 400 is located inside the outer packaging 100X. Note that, in the energy storage device 10X, the bottom side of the lid body 400 need not be located inside the outer packaging 100X. In the energy storage device 10X, the bottom side of the lid body 400 may be located outside the outer packaging 100X.

Also, in a state in which the electrode body 200 is accommodated, an electrode terminal 300 passes the lid body 400 and the outer packaging member 101 and protrudes outward of the outer packaging 100X. That is, the lid body 400 and the outer packaging member 101 are heat-sealed in a state in which the electrode terminal 300 is held therebetween. Note that, in the energy storage device 10X, the position at which the electrode terminal 300 protrudes outward need not be located between the lid body 400 and the outer packaging member 101. The electrode terminal 300 may protrude outward from a hole formed in any one of the six surfaces of the outer packaging 100X, for example. In this case, a slight gap between the outer packaging 100X and the electrode terminal 300 is filled with resin, for example.

Also, in the energy storage device 10x, the lid body 400 and the electrode terminal 300 are provided as separate bodies. However, the lid body 400 and the electrode terminal 300 need not be provided as separate bodies. The lid body 400 and the electrode terminal 300 may be formed as a single body, for example.

Figure 12:
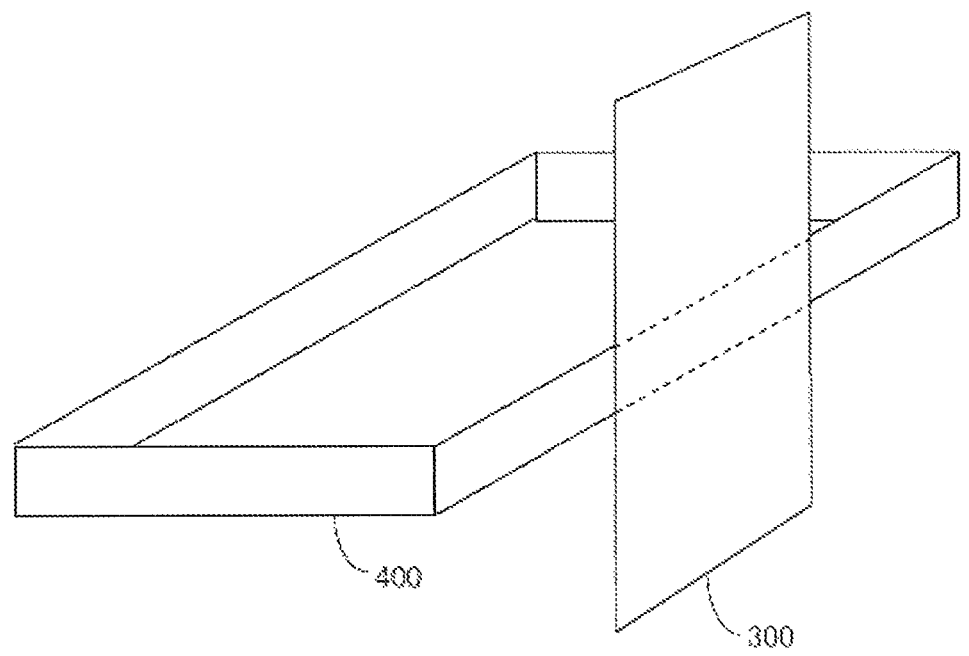
FIG. 12 is a diagram showing a first example in which a lid body and an electrode terminal are formed as a single body.

FIG. 12 is a diagram showing a first example in which the lid body 400 and the electrode terminal 300 are formed as a single body. As shown in FIG. 12, in the first example, the electrode terminal 300 is heat-sealed to the side surface of the lid body 400 in advance. Note that, if the lid body 400 is constituted by the outer packaging member 101, an adhesive film for adhering to both metal and resin may be disposed between the lid body 400 and the electrode terminal 300.

Figure 13:
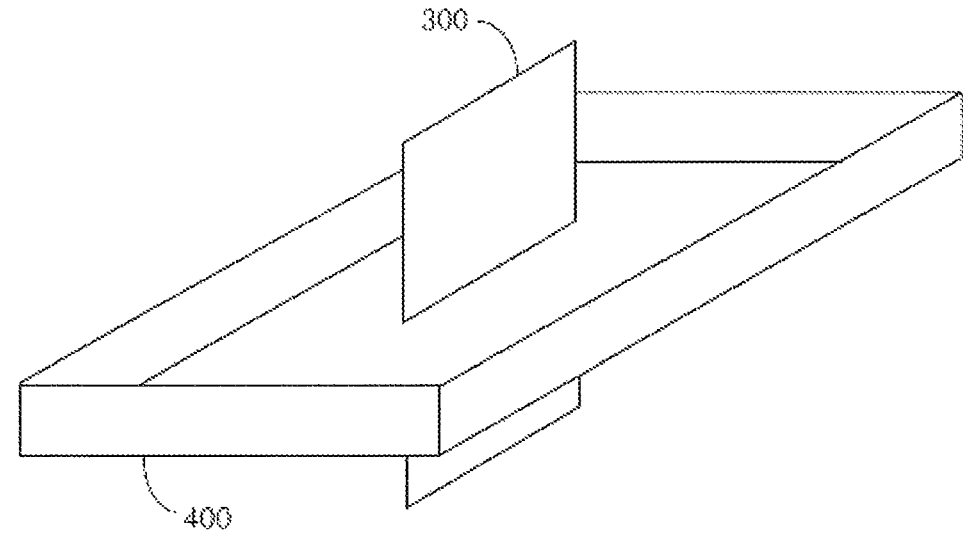
FIG. 13 is a diagram showing a second example in which a lid body and an electrode terminal are formed as a single body.

FIG. 13 is a diagram showing a second example in which the lid body 400 and the electrode terminal 300 are formed as a single body. As shown in FIG. 13, in the second example, the electrode terminal 300 passes through the hole formed in the bottom portion of the lid body 400. A slight gap at the hole in the bottom surface of the lid body 400 is filled with resin, for example.

Also, in the energy storage device 10X, a gas valve may be attached to the second sealing portion 120X or the hole formed in any one of the six surfaces of the outer packaging 100X, for example. The gas valve is constituted by a check valve or break valve, for example, and is configured to reduce pressure inside the outer packaging 100X when the pressure inside the outer packaging 100X rises due to gas generated inside the energy storage device 10X.

2-2. Method for Manufacturing Energy Storage Device

Figure 14:
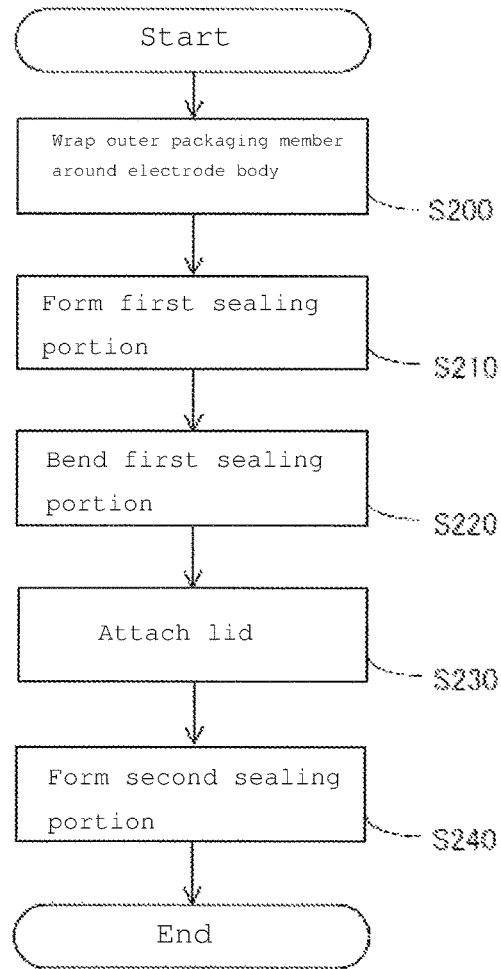
FIG. 14 is a flowchart showing a procedure for manufacturing the energy storage according to Embodiment 2.

FIG. 14 is a flowchart showing a procedure for manufacturing the energy storage device 10X. The steps shown in FIG. 14 are performed by an apparatus for manufacturing the energy storage device 10X, for example.

The manufacturing apparatus wraps the outer packaging member 101 around the electrode body 200 (step S200). The manufacturing apparatus forms the first sealing portion 110 by heat-sealing surfaces (the heat-sealable resin layers) of the outer packaging member 101 that face each other (step S210). Accordingly, an unfinished product shown in FIGS. 4 and 5 is obtained.

The manufacturing apparatus bends the first sealing portion 110 such that the first sealing portion 110 comes into contact with the second surface 140 (step S220). The manufacturing apparatus places the electrode body 200 in the unfinished product obtained in step S220, and attaches the lid body 400 to opening portions at the two ends thereof (step S230). The manufacturing apparatus forms the second sealing portion 120X by heat-sealing the outer packaging member 101 and the lid body 400 (step S240). Accordingly, the energy storage device 10X is completed.

2-3. Characteristics

In the energy storage device 10X according to Embodiment 2, the first sealing portion 110 is also bent toward the second surface 140 having a smaller area. Therefore, according to the energy storage device 10x, it is possible to suppress unevenness in the distribution of pressure applied to a lower energy storage device 10X when a plurality of the energy storage devices 10X are stacked on each other.

2-4. Other Characteristics

Note that, in the energy storage device 10X according to Embodiment 2, the first sealing portion 110 need not be bent toward the second surface 140 having a smaller area. The first sealing portion 110 may be bent toward the first surface 130 having a larger area. Also, the base portion of the first sealing portion 110 need not be located on a side 135 of the outer packaging 100x. The base portion of the first sealing portion 110 may be located on a surface of the outer packaging 100X other than the lid body 400. Even in this case, the energy storage device 10X according to Embodiment 2 has the following characteristics, for example.

The energy storage device 10X includes an electrode body (electrode body 200) and an outer packaging (outer packaging 100X) that seals the electrode body (electrode body 200). The outer packaging (outer packaging 100X) is wrapped around the electrode body (electrode body 200), and includes an outer packaging member (outer packaging member 101) provided with openings at the two end parts thereof and a lid body (lid body 400) that seals the openings.

In the energy storage device 10X, the second sealing portion 120X is not formed by heat-sealing surfaces of the outer packaging member 101 that face each other as in Example 1 (see FIG. 7). In the energy storage device 10x, the openings in the outer packaging member 101 wrapped around the electrode body 200 are sealed by the lid body 400. That is, the second sealing portion 120X is formed at a portion where the lid body 400 and the outer packaging member 101 overlap each other (see FIGS. 9 and 10). According to such a configuration, the size of the region of the second sealing portion 120X can be easily reduced by adjusting a depth L3 (FIG. 11) of the lid body 400.

Also, in the energy storage device 10X, excessive load is not applied due to a corner C1 (FIGS. 9 and 10) of the electrode body 200 in the outer packaging member 101 piercing the outer packaging member 101 at a position of the outer packaging member 101 where the corner C1 is covered. As described above, this is because, in the energy storage device 10X, the second sealing portion 120X is not formed by heat-sealing surfaces of the outer packaging member 101 that face each other as in Example 1.

Also, the procedure for manufacturing the energy storage device 10X is not limited to the procedure shown in the flowchart in FIG. 14. The energy storage device 10X may be manufactured using the procedure shown in the flowchart in FIG. 15, for example.

Figure 15:
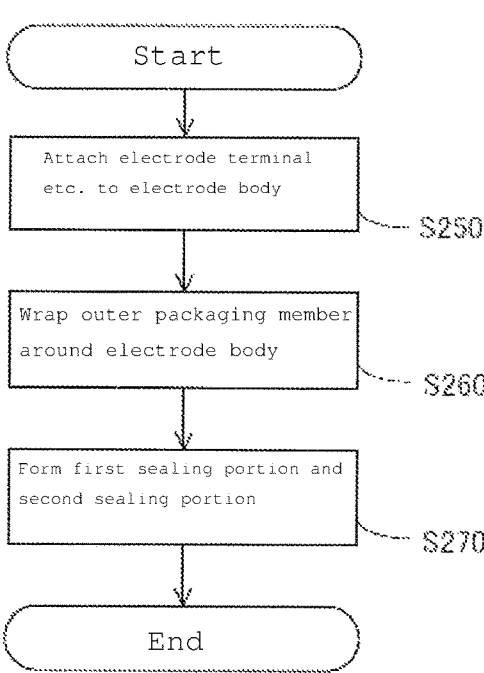
FIG. 15 is a flowchart showing another procedure for manufacturing the energy storage device according to Embodiment 2.

FIG. 15 is a flowchart showing another procedure for manufacturing the energy storage device 10X according to Embodiment 2. The steps shown in FIG. 15 are performed by an apparatus for manufacturing the energy storage device 10x, for example. The manufacturing apparatus attaches, to the electrode body 200, a member (e.g., the member shown in FIGS. 12 and 13) in which the electrode terminal 300 and the lid body 400 are formed as a single body (step S250). The electrode terminal 300 is welded to the electrode body 200, for example. Then, the manufacturing apparatus wraps the outer packaging member 101 around the electrode body 200 (step S260). The manufacturing apparatus forms the first sealing portion 110 by heat-sealing surfaces (the heat-sealable resin layers) of the outer packaging member 101 that face each other, and forms the second sealing portion 120X by heat-sealing the outer packaging member 101 and the lid body 400 (step S270). Accordingly, the energy storage device 10X is completed. The energy storage device 10X may also be manufactured using such a procedure.

3. Embodiment 3

For the purpose of making the electrolytic solution permeate through the electrode body in the battery manufacturing step, for example, a step of aging the energy storage device that is temporarily sealed in an environment at a predetermined temperature for a predetermined period of time (referred to as an "aging step" hereinafter) is usually performed. Gas is generated by the electrode body 200 in the aging step, and this gas needs to be discharged to the outside of the battery. The energy storage device 10X according to Embodiment 2 above is not provided with a mechanism for discharging the gas generated in the aging step at the final stage of the manufacturing of the energy storage device 10X. An energy storage device 10Y according to Embodiment 3 is provided with a mechanism for discharging the gas generated by the electrode body 200 at the final stage of the manufacturing of the energy storage device 10Y. Note that the following mainly describes portions that are different from those in Embodiment 2, and portions that are used in common with Embodiment 2 will not be described.

3-1. Configuration of Energy Storage Device

Figure 16:
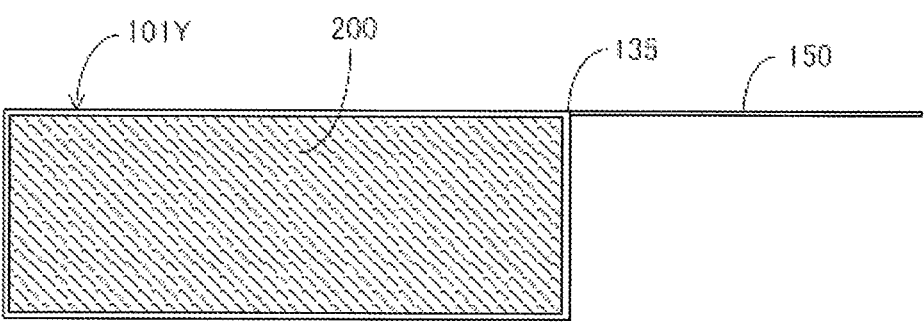
FIG. 16 is a diagram showing, from one lateral side, a state in which an outer packaging member is wrapped around an electrode body in Embodiment 3.
Figure 16:
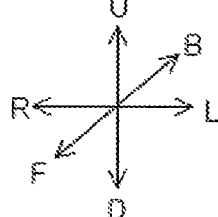
Figure 17:
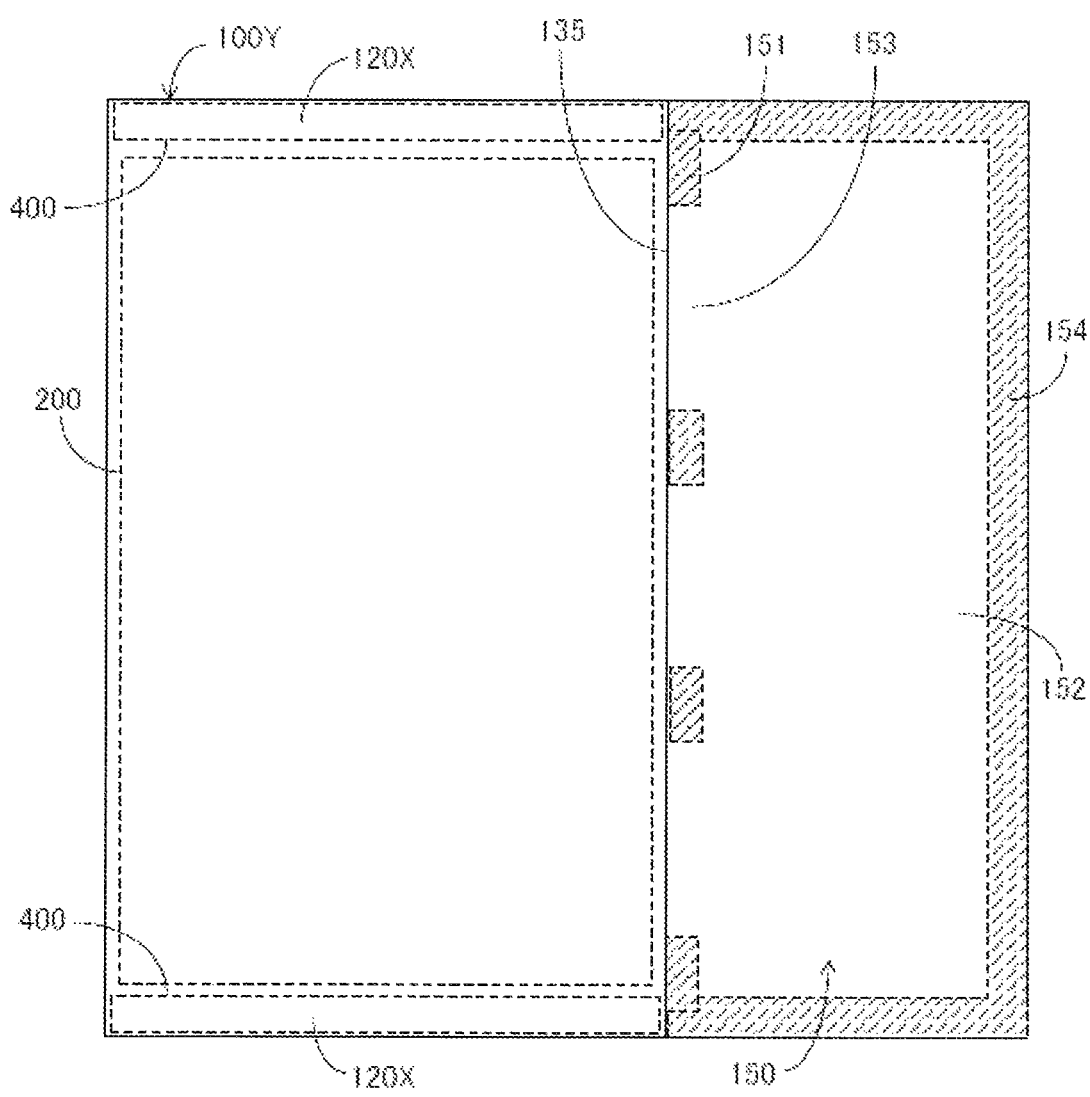
FIG. 17 is a diagram showing, from below, a state in which the outer packaging member is wrapped around the electrode body, and a lid body is attached to the outer packaging member in Embodiment 3.
Figure 17:
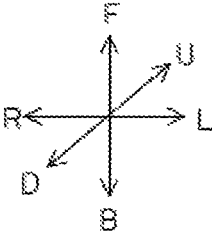

FIG. 16 is a diagram showing, from one lateral side, a state in which an outer packaging member 101Y is wrapped around the electrode body 200 during the manufacturing of the energy storage device 10Y. FIG. 17 is a diagram showing, from below, a state in which the outer packaging member 101Y is wrapped around the electrode body 200 and the lid body 400 is attached to the outer packaging member 101Y during the manufacturing of the energy storage device 10Y.

As shown in FIGS. 16 and 17, a piece 150 is formed in a state in which the outer packaging member 101Y is wrapped around the electrode body 200. The piece 150 is formed by joining surfaces of the outer packaging member 101Y that face each other in a state in which the outer packaging member 101Y is wrapped around the electrode body 200. More specifically, the piece 150 is formed by joining (heat-sealing) peripheral edges of the surfaces of the outer packaging member 101Y that face each other in a state in which the outer packaging member 101Y is wrapped around the electrode body 200. That is, a first sealing portion 154 is formed at the peripheral edge of the piece 150.

Also, a space 152 in which the surfaces of the outer packaging member 101Y that face each other are not joined is formed in the piece 150. Joined regions 151, in which the surfaces of the outer packaging member 101Y that face each other are joined, and an un-joined region 153, in which the surfaces of the outer packaging member 101Y that face each other are not joined, are alternatingly arranged in the vicinity of the side 135. That is, a pattern of the joined regions 151 is formed along the side 135 in the piece 150.

As a result of unsealing the outer packaging 100Y by cutting off a portion of the piece 150, the gas generated by the electrode body 200 is discharged from the outer packaging 100Y. Note that the gas discharged to the outside of the outer packaging 100Y here is not necessarily limited to gas generated by the electrode body 200, and may be gas other than the gas generated by the electrode body 200, such as air, water vapor, or hydrogen sulfide.

Then, the outer packaging 100Y is placed in a sealed state again by heat-sealing portions including the vicinity of the side 135 in a belt shape. Accordingly, the energy storage device 10Y is completed. In the completed energy storage device 10Y, regions in which the surfaces of the outer packaging member 101Y that face each other have a strong joining force are arranged along the side 135 alternatingly with regions in which the surfaces thereof that face each other have a weak joining force, in the vicinity of the side 135. In other words, thin portions and thick portions are alternatingly arranged along the side 135 in the heat-sealing portion in the vicinity of the side 135. This is because the un-joined region 153 is single-sealed, but the joined regions 151 are double-sealed by heat-sealing the vicinity of the side 135 again.

3-2. Method for Manufacturing Energy Storage Device

Figure 18:
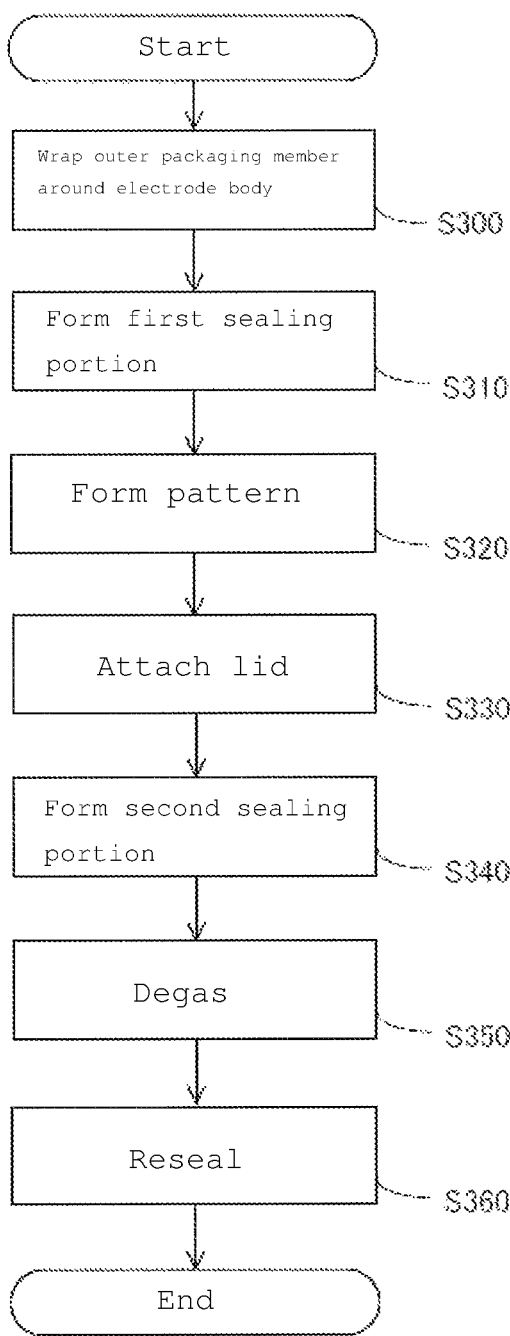
FIG. 18 is a flowchart showing a procedure for manufacturing the energy storage device according to Embodiment 3.

FIG. 18 is a t showing a procedure for manufacturing the energy storage device 10Y. The steps shown in FIG. 18 are performed by an apparatus for manufacturing the energy storage device 10Y, for example.

The manufacturing apparatus wraps the outer packaging member 101Y around the electrode body 200 (step S300). The manufacturing apparatus forms the first sealing portion 154 by heat-sealing peripheral edges of the surfaces (the heat-sealable resin layers) of the outer packaging member 101Y that face each other (step S310). The manufacturing apparatus forms a pattern of the joined regions 151 by heat-sealing the surfaces of the outer packaging member 101Y that face each other in the vicinity of the side 135 (step S320).

The manufacturing apparatus attaches the lid body 400 to opening portions at the two ends in a state in which the electrode body 200 is accommodated in the unfinished product obtained in step S320 (step S330). The manufacturing apparatus forms the second sealing portion 120X by heat-sealing the outer packaging member 101Y and the lid body 400 (step S340). Then, the aging step is carried out.

The manufacturing apparatus degases the gas generated in the aging step by cutting the piece 150, for example (step S350). The manufacturing apparatus seals the outer packaging 100Y again by heat-sealing the portion including the joined regions 151 of the piece 150 in a belt shape and removing the end edge portion (step S360). Then, the energy storage device 10Y is completed by bending the piece 150 toward the second surface 140.

3-3. Characteristics

In the energy storage device 10Y according to Embodiment 3, the piece 150 that includes the first sealing portion 154 is also bent toward the second surface 140 having a smaller area. Therefore, according to the energy storage device 10Y, it is possible to suppress unevenness in the distribution of pressure applied to a lower energy storage device 10Y when a plurality of the energy storage devices 10Y are stacked on each other. If this energy storage device 10Y is used in an all-solid-state battery, a packaging form of the present invention is preferable because high pressure needs to be evenly applied from the outer surface of the battery in order to exhibit battery performance.

4. Embodiment 4

In the energy storage device 10X according to Embodiment 2 above, the position at which the electrode terminal 300 protrudes outward is located between the lid body 400 and the outer packaging member 101. However, the position at which the electrode terminal 300 protrudes outward is not limited to this. Note that the following mainly describes portions that are different from those in Embodiment 2, and portions that are used in common with Embodiment 2 will not be described.

4-1. Configuration of Energy Storage Device

Figure 19:
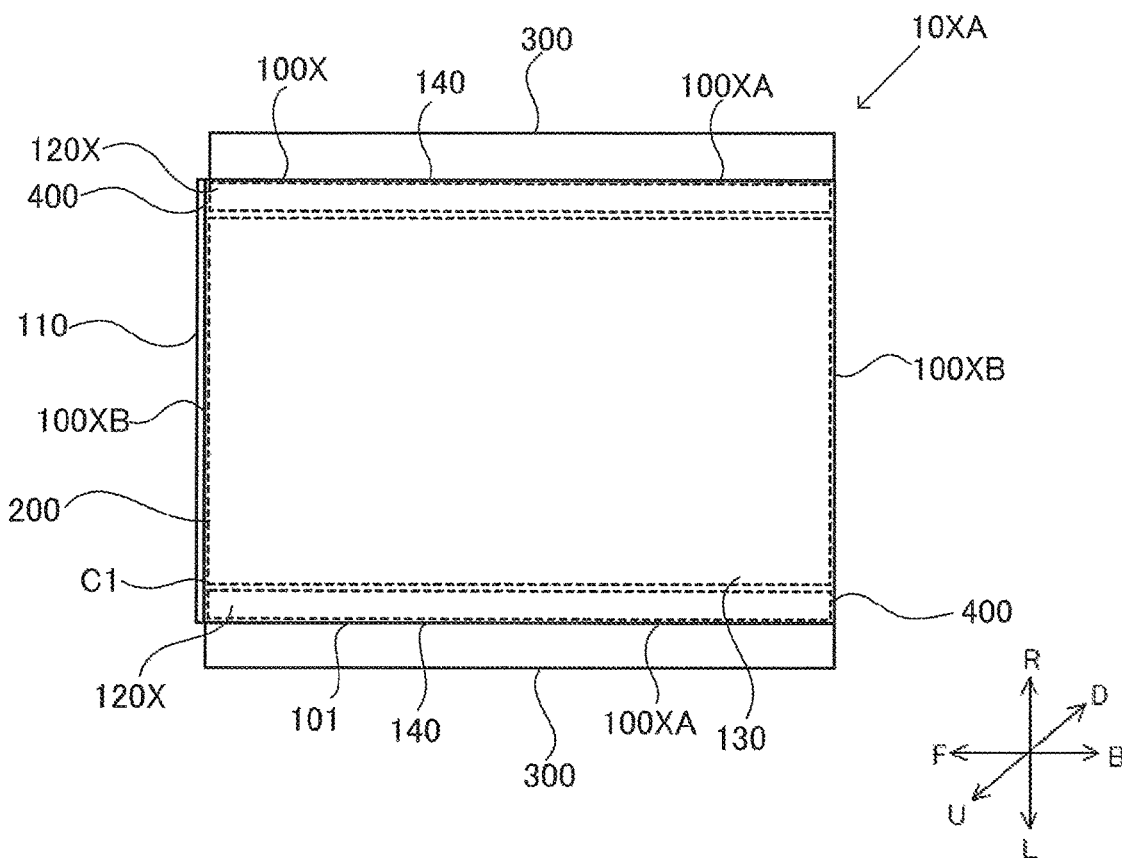
FIG. 19 is a plan view schematically showing an energy storage device according to Embodiment 4.
Figure 20:
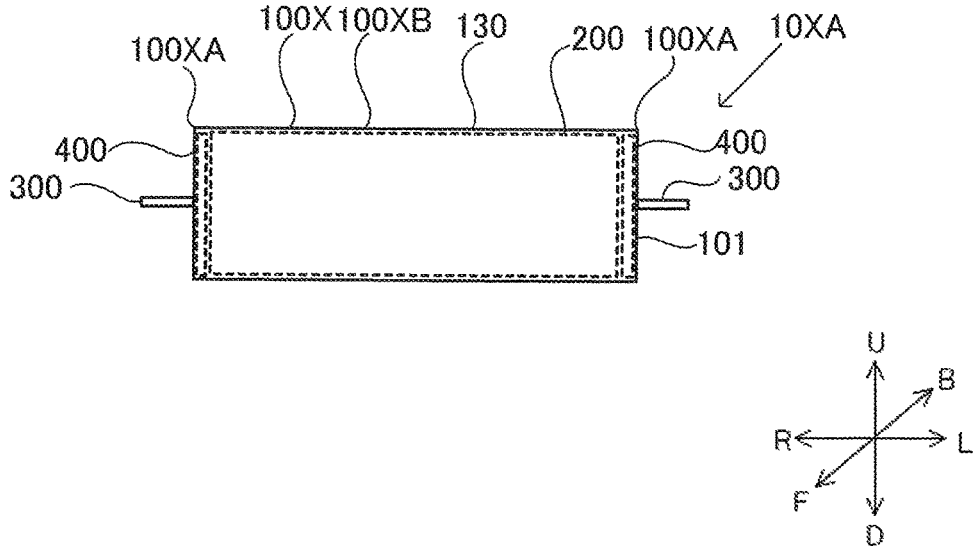
FIG. 20 is a side view schematically showing the energy storage device according to Embodiment 4.

FIG. 19 is a plan view schematically showing an energy storage device 10XA according to Embodiment 4. FIG. 20 is a side view schematically showing the energy storage device 10XA. An outer packaging 100X of the energy storage device 10XA includes a pair of long sides 100XA and a pair of short sides 100XB in a plan view. The outer packaging 100X is configured by fitting the lid body 400 against opening portions extending along the long sides 100XA of the outer packaging member 101 wrapped around the electrode body 200. The second sealing portion 120X is formed by heat-sealing the outer packaging member 101 and the lid body 400 in a state in which the lid body 400 is fitted against the opening portions. The lid body 400 is provided with a through-hole (not shown). Two electrode terminals 300 protrude from the through-hole in the lid body 400 to the outside the outer packaging 100X. The two electrode terminals 300 have a shape extending along the long sides 100XA of the outer packaging 100X. A slight gap between the through-hole and the electrode terminal 300 is filled with resin, for example. In Embodiment 4, the first sealing portion 110 is formed on one side of the two short sides 100XB.

The position of the lid body 400 from which the electrode terminal 300 protrudes in the thickness direction (the arrow UD direction) of the energy storage device 10XA can be suitably selected. In Embodiment 4, as shown in FIG. 20, the electrode terminals 300 protrude from substantially the center of the lid body 400 in the thickness direction of the energy storage device 10XA to the outside of the outer packaging 100X. The length of the electrode terminal 300 in the depth direction (the arrow FB direction) of the energy storage device 10XA can be suitably selected. In Embodiment 4, the length of the electrode terminal 300 in the depth direction (the arrow FB direction) of the energy storage device 10XA is substantially the same as the length of the electrode body 200.

4-2. Characteristics

In the energy storage device 10XA according to Embodiment 4, the electrode terminals 300 are disposed along the long sides 100XA having a long length in the depth direction, and thus a larger electrode terminal 300 can be used. Therefore, it is possible to provide a high-power energy storage device 10XA.

5. Variations

Although Embodiments 1 to 4 were described above, the present invention is not limited to Embodiments 1 to 4 above, and various modifications can be made without departing from the gist thereof. Hereinafter, variations will be described.

<5-1>

One outer packaging member is wrapped around the electrode body 200 in Embodiments 1 to 4 above. However, the number of outer packaging members wrapped around the electrode body 200 need not be one. Two outer packaging members may be wrapped around the electrode body 200, for example.

Figure 21:
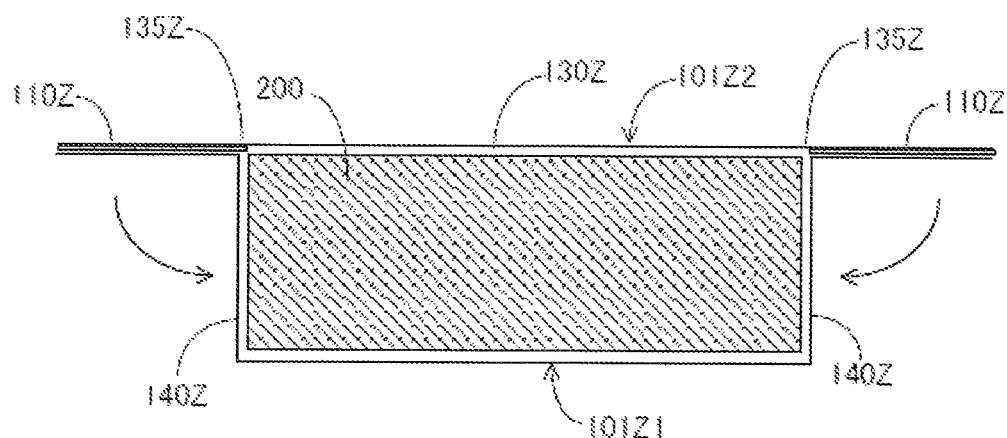
FIG. 21 is a diagram showing, from one lateral side, a state in which outer packaging members are wrapped around an electrode body in a variation.
Figure 21:
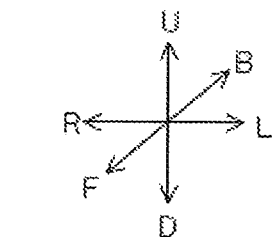

FIG. 21 is a diagram showing, from one lateral side, a state in which outer packaging members 101Z1 and 10122 are wrapped around the electrode body during 200 the manufacturing of an energy storage device according to a variation. As shown in FIG. 21, the electrode body 200 is covered by the outer packaging members 10121 and 10122. First sealing portions 110Z are formed by joining opposing surfaces of the outer packaging members 10121 and 10122. In this example, the first sealing portions 110Z are bent toward the second surfaces 140Z, instead of toward the first surface 130Z. Even with such a configuration, it is possible to achieve the effect of suppressing unevenness in the distribution of pressure applied to a lower energy storage device when a plurality of energy storage devices are stacked on each other. If this energy storage device is used in an all-solid-state battery, a packaging form of the present invention is preferable because high pressure needs to be evenly applied from the outer surface of the battery in order to exhibit battery performance. Note that the first sealing portions 110Z need not be bent in this example. Also, in this variation, the sealing portions 110Z may each be sealed in a state in which the sealing portion 110Z holds a portion of an electrode terminal 300. Further, in this variation, the first sealing portions 110Z need not be formed on the side 135Z, and may protrude outward from substantially the center of the second surfaces 140Z in the thickness direction of the energy storage device.

<5-2>

Although the electrode body 200 is a so-called stack type in which a plurality of electrodes 210 are laminated in Examples 1 to 4 above, the form of the electrode bodies 200 is not limited to this. The electrode body 200 may be a so-called wrapping type in which the electrode body 200 is configured by wrapping a positive electrode and a negative electrode via a separator, for example. Also, the electrode body 200 may be configured by stacking a plurality of wrapping-type electrode bodies.

<5-3>

Also, in Embodiments 1 to 4 above, the second surface 140 is a flat surface extending downward from the first surface 130 at a substantially right angle. However, the form of the second surface 140 is not limited to this. Considering a case where the electrode body 200 is a wrapping type, and a flat surface and a curved surface are formed on an outer periphery of the electrode body, for example, it is presumed that the flat surface has a larger area than the curved surface, the first surface 130 covers the flat surface of the electrode body, and the second surface 140 covers the curved surface of the electrode body. In this case, the second surface 140 may also be constituted by the curved surface. In this case, a boundary portion where the second surface 140 extends downward from the first surface 130 serves as the side 135.

<5-4>

Also, four joined regions 151 are formed in Embodiment 3. However, the number of positions at which the joined regions 151 are formed is not limited to this. The joined regions 151 may be formed at two positions in the vicinities of the two ends along the side 135, at one position in the vicinity of the center of the side 135, or at five or more positions, for example.

<5-5>

Figure 22:
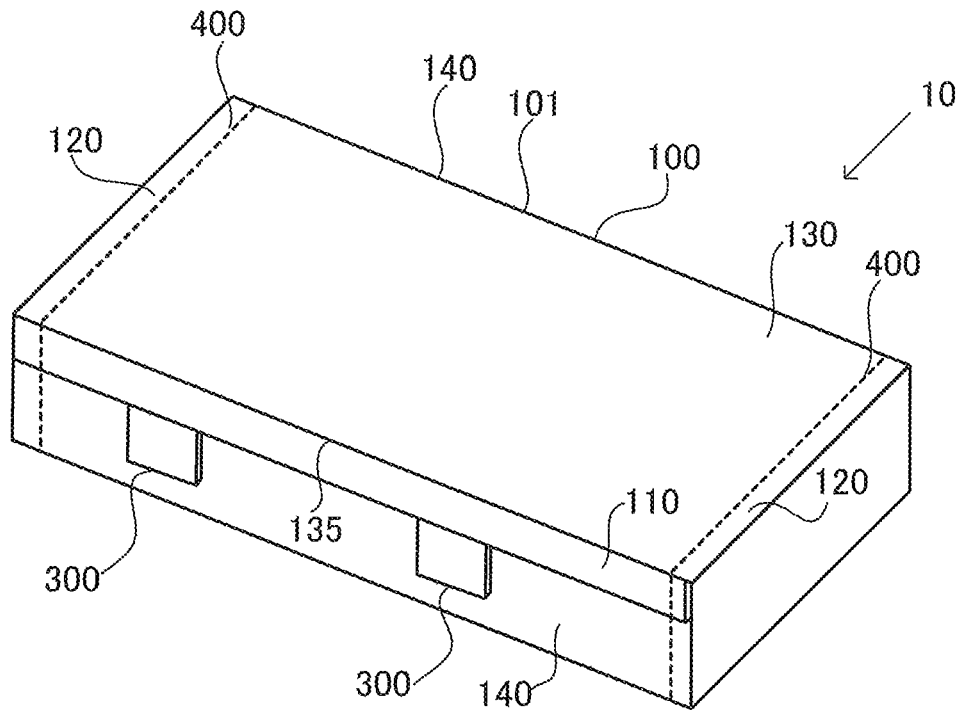
FIG. 22 is a perspective view schematically showing an energy storage device according to a variation.

Although the electrode terminal 300 is disposed in the second sealing portion 120 in Embodiment 1, the position at which the electrode terminal 300 is disposed on the outer packaging 100 is not limited to this. As shown in FIG. 22, the electrode terminals 300 can be disposed in the first sealing portion 110, for example. In other words, the first sealing portion 110 is sealed in a state in which the first sealing portion 110 holds the electrode terminals 300. In this variation, at least one of the two electrode terminals 300 may be bent toward the second surface 140 or to the opposite side to the second surface 140, or need not be bent so as to protrude outward from the side 135. Because the electrode terminals 300 and the first sealing portion 110 can be easily sealed in this variation, the sealing performance of the outer packaging 100 can be improved. Also, the electrode body 200 can be easily accommodated in the outer packaging 100. Note that, in this variation, the lid body 400 is fitted against the opening portions at the two ends of the outer packaging member 101 as in Embodiment 2, for example. The second sealing portion 120 is formed by heat-sealing the outer packaging member 101 and the lid body 400 in a state in which the lid body 400 is fitted against the opening portions.

<5-6>

Figure 23:
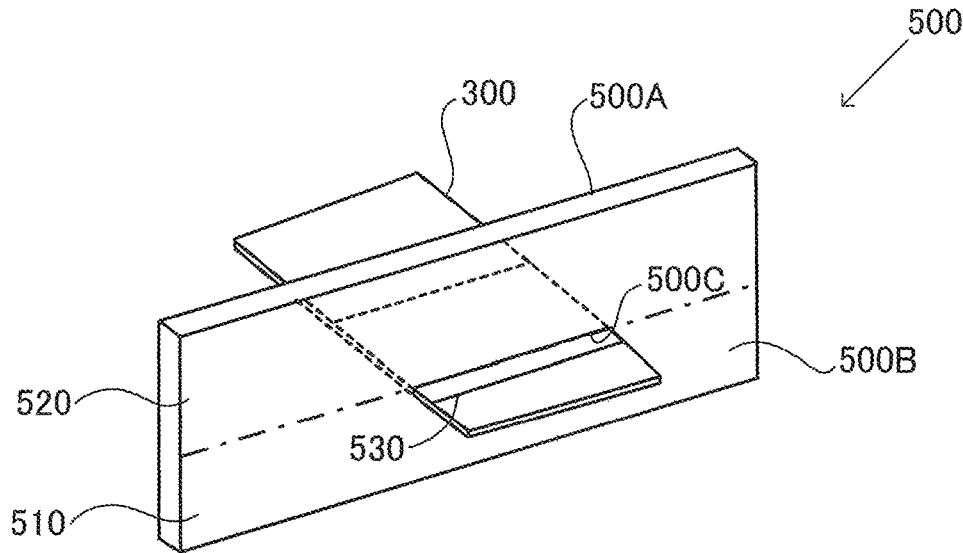
FIG. 23 is a perspective view schematically showing a lid body according to a variation and an electrode terminal attached to the lid body.

Also, the configuration of the lid body 400 can be optionally changed in Embodiment 2. FIG. 23 is a perspective view showing a lid body 500, which is a variation of the lid body 400. The lid body 500 has a plate shape, for example, and includes a first surface 500A facing the electrode body 200 (see FIG. 9), and a second surface 500B that is opposite to the first surface 500A. A hole 500C that passes through the first surface 500A and the second surface 500B is formed at the center of the lid body 500. A material constituting the lid body 500 is resin, for example. In this variation, it is preferable that an adhesive film 530 for adhering to both the electrode terminal 300 and the lid body 500 is attached to a predetermined range that includes a portion of the electrode terminal 300 that is joined to the lid body 500. The lid body 500 may be constituted by a member that is divided into a first portion 510 and a second portion 520, and the lid body 500 may be manufactured through joining them together such that the first portion 510 and the second portion 520 hold the electrode terminal 300 and the adhesive film 530. Also, the lid body 500 may be manufactured by insert-molding the lid body 500 with respect to the electrode terminal 300 to which the adhesive film 530 is attached. Furthermore, it is preferable that the barrier layer is laminated on at least a portion of the surface of the lid body 500 in this variation. Alternatively, if the lid body 500 has a plurality of layers, a barrier layer may be formed on any layer. The material constituting the barrier layer is aluminum, for example. Note that, in this variation, if a gap is present between the adhesive film 530 and the hole 530C, this gap is preferably filled with a resin material such as a hot melt, for example.

Figure 24:
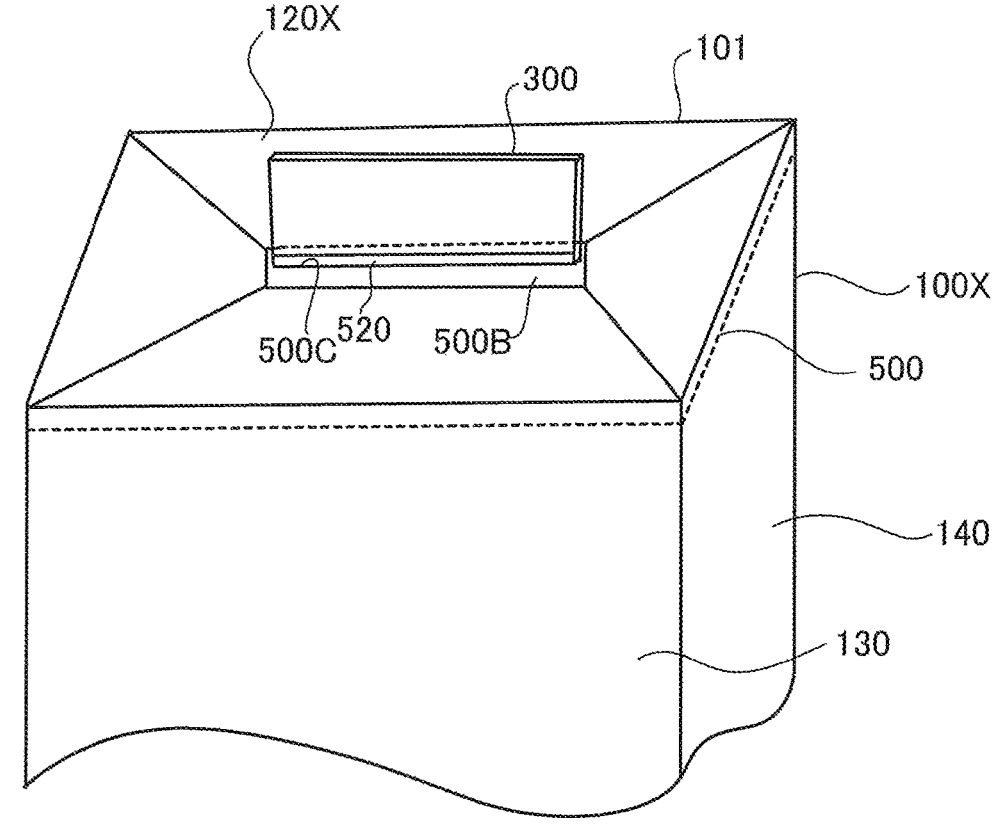
FIG. 24 is a perspective view schematically showing an energy storage device to which the lid body shown in FIG. 23 is attached.

Also, in this variation, as shown in FIG. 24, a second sealing portion 120X is formed by joining the outer packaging member 101 and the second surface 500B of the lid body 500 together in a state in which the lid body 500 is fitted to the outer packaging 100X. A means of joining the outer packaging member 101 and the second surface 500B of the lid body 500 together is heat sealing, for example. In this variation, the outer packaging member 101 is joined to a wider range of the lid body 500, and thus the sealing performance of the outer packaging 100X is improved.

Figure 25:
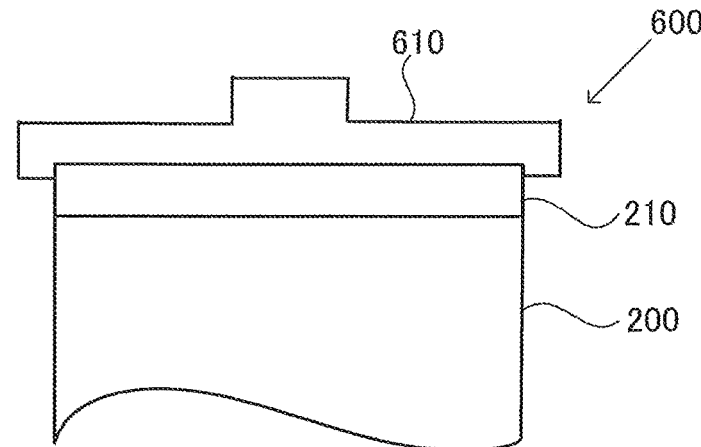
FIG. 25 is a front view schematically showing a lid body according to another variation.

FIG. 25 is a front view of a lid body 600, which is another variation of the lid body 400 in Embodiment 2 above. The lid body 600 includes a metal portion 610, which is a portion where metal is exposed on the surface thereof, and the metal portion 610 and the electrode 210 of the electrode body 200 are welded to each other. The entire lid body 600 may be constituted by only the metal portion 610, or the metal portion 610 may be formed on a portion of the lid body 600. If the metal portion 610 is formed on only a portion, the lid body 600 is constituted by a material having a multilayer structure that includes a metal layer. If the lid body 600 is constituted by a material having a multilayer structure in which the metal layer is an intermediate layer, the metal portion 610 is a portion where a layer other than the metal layer is partially removed such that the metal layer is exposed. In the example shown in FIG. 25, the metal portion 610 of the lid body 600 functions as an electrode terminal, and thus space is not required between the lid body 600 and the electrode 210. Therefore, it is possible to reduce the size of the energy storage device 10X (see FIG. 9).

Figure 26:
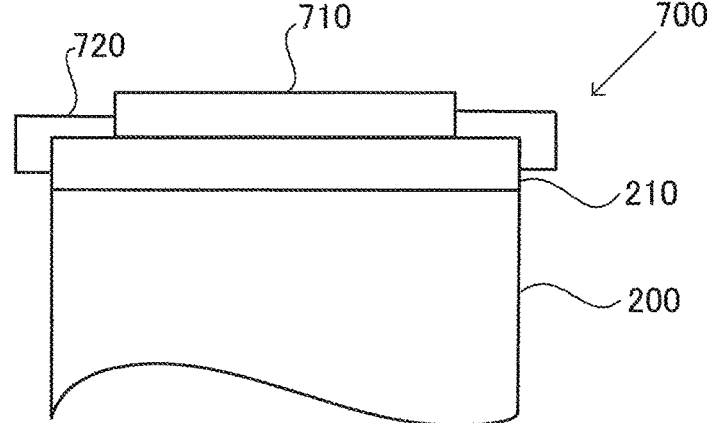
FIG. 26 is a front view schematically showing a lid body according to yet another variation.

FIG. 26 is a front view of a lid body 700, which is another variation of the lid body 400 in Embodiment 2 above. The lid body 700 includes a metal portion 710 made of a metal material and a non-metal portion 720 that is connected to the metal portion 710 and is made of a resin material. The metal portion 710 is welded to an electrode 210 of an electrode body 200. In the example shown in FIG. 26, the metal portion 710 of the lid body 700 functions as the electrode terminal, and thus space is not required between the lid body 700 and the electrode 210. Therefore, it is possible to reduce the size of the energy storage device 10X (see FIG. 9).

<5-7>

Figure 27:
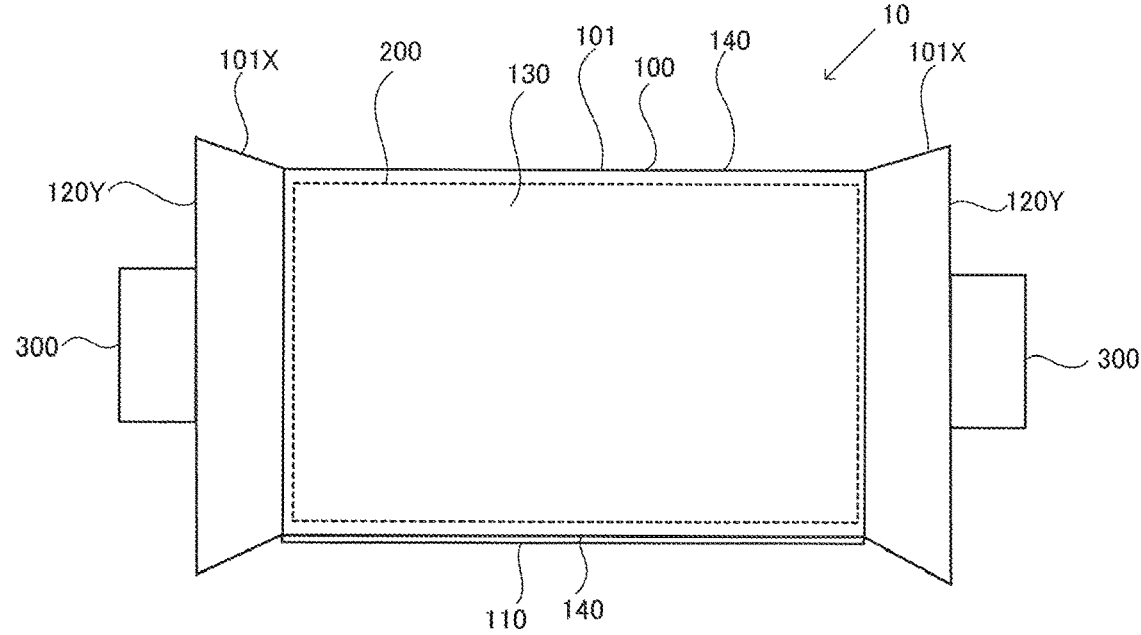
FIG. 27 is a plan view schematically showing an energy storage device according to another variation.

Also, in Embodiment 1 above, the second sealing portion 120 is formed by folding the outer packaging member 101 and heat-sealing the heat-sealable resin layers of the outer packaging member 101. However, the method for forming the second sealing portion 120 is not limited to this. FIG. 27 is a plan view schematically showing the energy storage device 10 having a second sealing portion 120Y according to a variation. The outer packaging member 101 has extending portions 101X that extend outward of the outer packaging 100, and the second sealing portion 120Y is formed by heat-sealing heat-sealable resin layers of the extending portions 101x.

In a portion of the extending portion 101X where the electrode terminal 300 is disposed, the heat-sealable resin layers of the extending portion 101X and the electrode terminal 300 are heat-sealed. According to this variation, the second sealing portions 120Y can be strongly heat-sealed, and thus the sealing performance of the outer packaging 100 can be improved. Note that portions of the extending portions 101X other than the portions heat-sealed together with the electrode terminals 300 may be cut as needed in this variation. Note that this variation can be applied to the variation shown in FIG. 22.

LIST OF REFERENCE NUMERALS 10, 10X, 10XA, 10Y, 10Z Energy storage device
100, 100X, 100Y Outer packaging
101, 101Y, 101Z1, 101Z2 Outer packaging member
101X Extending portion
110, 110Z, 154 First sealing portion
120, 120X, 120Y Second sealing portion
130, 130Z First surface
135, 135Z Side
140, 140Z Second surface
150 Piece
151 Joined region
152 Space
153 Un-joined region
200 Electrode body
210 Electrode
215 Current collector
300 Electrode terminal
500A First surface
500B Second surface
400, 500, 700 Lid body
610, 710 Metal portion
C1 Corner

The invention claimed is:

1. An energy storage device comprising:
an electrode body; and
an outer packaging that seals the electrode body, wherein the outer packaging includes:
    a film-like outer packaging member wound around the electrode body to have an opening,
    a lid body fitted into the opening, and
    a first sealing portion that is sealed by joining surfaces that face each other in a state in which the outer packaging member is wrapped around the electrode body,
a base portion of the first sealing portion is at a boundary between a first surface and a second surface of the outer packaging,
the first surface has a larger area than the second surface,
the first sealing portion does not overlap the first surface in a plan view, and
the lid body is a resin-molded or metal-molded product.

2. The energy storage device according to claim 1, wherein the first sealing portion is bent to be in contact with the second surface.

3. The energy storage device according to claim 2, wherein the first sealing portion covers substantially the entire second surface in a state in which the first sealing portion is bent to be in contact with the second surface.

4. The energy storage device according to claim 1, further comprising:
an electrode terminal that is electrically connected to the electrode body,
wherein the outer packaging further includes a second sealing portion sealed in a state of holding the electrode terminal,
a portion of the electrode terminal is outside of the outer packaging, and
a base portion of the portion of the electrode terminal is at a position at approximately half of the thickness of the energy storage device in a thickness direction of the energy storage device.

5. The energy storage device according to claim 1, wherein a region where a joining force between the surfaces is strong and a region where the joining force between the surfaces is weak are side-by-side along the boundary in the first sealing portion.

6. The energy storage device according to claim 1, wherein a thin region and a thick region are side-by-side along the boundary in the first sealing portion.

7. The energy storage device according to claim 1, further comprising:
an electrode terminal that is electrically connected to the electrode body,
wherein the first sealing portion is sealed in a state of holding the electrode terminal.

8. The energy storage device according to claim 1, further comprising:
an electrode terminal that is electrically connected to the electrode body; wherein
the electrode terminal is attached to the lid body, and
the outer packaging further includes a second sealing portion sealed in a state of being joined to the lid body.

9. The energy storage device according to claim 8, wherein the lid body includes a first surface facing the electrode body and a second surface that is opposite to the first surface, and
the second sealing portion includes a portion where the outer packaging and the second surface are joined together.

10. The energy storage device according to claim 1, wherein the outer packaging further includes a second sealing portion sealed in a state of being joined to the lid body,
the lid body includes a metal portion that is where a metal layer is exposed on a surface of the lid body or that is made of a metal material, and
the metal portion and the electrode body are welded to each other.

11. The energy storage device according to claim 1, further comprising:
an electrode terminal that is electrically connected to the electrode body,
wherein the outer packaging further includes an extending portion that protrudes outward and a second sealing portion sealed in a state in which the electrode terminal is held by the extending portion.

12. The energy storage device according to claim 1, wherein a direction extending along the boundary is orthogonal to a machine direction of the outer packaging member.

13. An energy storage device comprising:
an electrode body; and
an outer packaging that seals the electrode body, wherein
the outer packaging is constituted by a film-like outer packaging member,
the outer packaging includes a piece in which peripheral edges of surfaces that face each other are joined together in a state in which the outer packaging member is wrapped around the electrode body,
a base portion of the piece is at a boundary between surfaces of the outer packaging,
a space in which the surfaces that face each other are not joined is in the piece,
in the piece, a region in which the surfaces that face each other are joined together and a region in which the surfaces that face each other are not joined are side-by-side in a vicinity of the boundary, and
in the region in which the surfaces that face each other are not joined, opposing inner surfaces of the outer packaging member face each other directly without any intervening element.

14. A method for manufacturing an energy storage device from an unfinished product,
the unfinished product including
an electrode body, and
an outer packaging that seals the electrode body,
the outer packaging being constituted by a film-like outer packaging member,
the outer packaging including a piece in which peripheral edges of surfaces that face each other are joined together in a state in which the outer packaging member is wrapped around the electrode body,
a base portion of the piece being at a boundary between surfaces of the outer packaging,
a space in which the surfaces that face each other are not joined being in the piece, and
in the piece, a region in which the surfaces that face each other are joined together and a region in which the surfaces that face each other are not joined being side-by-side in a vicinity of the boundary,
the manufacturing method comprising:
unsealing the outer packaging with use of the piece and discharging gas from the outer packaging; and
resealing the outer packaging by joining the surfaces that face each other in at least a portion of the piece.

15. The energy storage device according to claim 13, further comprising:

an electrode terminal that is electrically connected to the electrode body; and a lid body to which the electrode terminal is attached, wherein the outer packaging further includes a second sealing portion sealed in a state of being joined to the lid body, the lid body includes a first surface facing the electrode body and a second surface that is opposite to the first surface, and the second sealing portion includes a portion where the outer packaging and the second surface are joined together.

16. The energy storage device according to claim 13, further comprising:

a lid body, wherein the outer packaging further includes a second sealing portion sealed in a state of being joined to the lid body, the lid body includes a metal portion that is where a metal layer is exposed on a surface of the lid body or that is made of a metal material, and the metal portion and the electrode body are welded to each other.

17. A method for manufacturing an energy storage device from an unfinished product, according to claim 14, wherein the unfinished product includes an electrode terminal that is electrically connected to the electrode body, and a lid body to which the electrode terminal is attached, the outer packaging further includes a second sealing portion sealed in a state of being joined to the lid body, the lid body includes a first surface facing the electrode body and a second surface that is opposite to the first surface, and the second sealing portion includes a portion where the outer packaging and the second surface are joined together.

18. A method for manufacturing an energy storage device from an unfinished product, according to claim 14, wherein the unfinished product includes a lid body, the outer packaging further includes a second sealing portion sealed in a state of being joined to the lid body, the lid body includes a metal portion that is where a metal layer is exposed on a surface of the lid body or that is made of a metal material, and the metal portion and the electrode body are welded to each other.

19. The energy storage device according to claim 1, wherein the lid body is a tray-shaped member having a bottom and a rectangular shape in a plan view.

20. The energy storage device according to claim 1, wherein the lid body has a plate shape.

21. The energy storage device according to claim 1, wherein the lid body has a member that is divided into a plurality of parts so that holes are formed through which electrode terminal can be placed.

* * * * *